(12) United States Patent
Covalin et al.

(10) Patent No.: US 12,465,764 B1
(45) Date of Patent: Nov. 11, 2025

(54) DELIVERY OF NON-PENETRATING ELECTRICAL NEUROSTIMULATION THERAPY

(71) Applicant: Spark Biomedical, Inc., Dallas, TX (US)

(72) Inventors: Alejandro Covalin, Los Angeles, CA (US); Navid Khodaparast, Dallas, TX (US)

(73) Assignee: SPARK BIOMEDICAL, INC., Dallas, TX (US)

( * ) Notice: Subject to any disclaimer, the term of this patent is extended or adjusted under 35 U.S.C. 154(b) by 0 days.

(21) Appl. No.: 18/902,006

(22) Filed: Sep. 30, 2024

(51) Int. Cl.
  *A61N 1/36* (2006.01)
  *A61N 1/04* (2006.01)

(52) U.S. Cl.
  CPC ....... *A61N 1/36021* (2013.01); *A61N 1/0456* (2013.01); *A61N 1/0472* (2013.01); *A61N 1/36034* (2017.08)

(58) Field of Classification Search
  CPC ............ A61N 1/36021; A61N 1/36034; A61N 1/0456; A61N 1/0492
  See application file for complete search history.

(56) References Cited

U.S. PATENT DOCUMENTS

| | | | |
|---|---|---|---|
| 2007/0078496 A1* | 4/2007 | Greenberg | A61N 1/36046 607/54 |
| 2009/0005833 A1* | 1/2009 | Cameron | A61N 1/361 607/45 |
| 2015/0335876 A1 | 11/2015 | Jeffery et al. | |
| 2020/0086124 A1* | 3/2020 | Kibler | A61N 1/36071 |
| 2020/0238085 A1 | 7/2020 | Khodaparast et al. | |
| 2021/0213286 A1 | 7/2021 | Covalin et al. | |
| 2022/0192580 A1 | 6/2022 | Toth et al. | |
| 2022/0305260 A1 | 9/2022 | Covalin et al. | |
| 2024/0042203 A1 | 2/2024 | Gill et al. | |

OTHER PUBLICATIONS

Chakravarthy, K., et al. (2019). Mechanism of Action in Burst Spinal Cord Stimulation: Review and Recent Advances. Pain Medicine, 20(Supplement_1), S13-S22.

(Continued)

*Primary Examiner* — Alyssa M Alter
(74) *Attorney, Agent, or Firm* — Finch & Maloney PLLC

(57) ABSTRACT

In an illustrative embodiment, methods and systems include delivering neurostimulation therapy, including delivering a first pulse series including a) delivering a suprathreshold cathodic pulse to a first electrode to stimulate a first neural structure, thereby producing a corresponding anodic pulse on a second electrode, and b) delivering a charge-balancing subthreshold anodic pulse with reversed polarity of the suprathreshold cathodic pulse to the first electrode, thereby producing a corresponding cathodic pulse on the second electrode, and delivering a second pulse series including c) delivering a suprathreshold cathodic pulse to the second electrode to stimulate a second neural structure, thereby producing a corresponding anodic pulse on the first electrode, and d) delivering a charge-balancing subthreshold anodic pulse with reversed polarity of the suprathreshold cathodic pulse to the second electrode, thereby producing a corresponding cathodic pulse on the first electrode.

21 Claims, 18 Drawing Sheets

(56) References Cited

OTHER PUBLICATIONS

Kringelbach, M. L., et al. (2007). Translational principles of deep brain stimulation. Nature Reviews Neuroscience, 8(8), 623-635.
Prausnitz, M. R. (1996). The effects of electric current applied to skin: a review for transdermal drug delivery. Advanced Drug Delivery Reviews, 18(3), 395-425.
Rollman, G. B., & Harris, G. (1987). The detectability, discriminability, and perceived magnitude of painful electrical shock. Perception & Psychophysics, 42(3), 257-268.
Laubacher, M., et al. (2017). Power output and fatigue properties using spatially distributed sequential stimulation in a dynamic knee extension task. European Journal of Applied Physiology, 117(9), 1787-1798.
Bautista, D. M., & Lumpkin, E. A. (2011). Probing mammalian touch transduction. The Journal of General Physiology, 138(3), 291-301.
Yarnitsky, D., et al. (2010). Recommendations on terminology and practice of psychophysical DNIC testing. European Journal of Pain, 14(4), 339-339.
Price, D. D., et al. (1977). Peripheral suppression of first pain and central summation of second pain evoked by noxious heat pulses. Pain, 3(1), 57-68.
Wiech, K. (2016). Deconstructing the sensation of pain: The influence of cognitive processes on pain perception. Science, 354(6312), 584-587.
Carson, R. G., & Buick, A. R. (2019). Neuromuscular electrical stimulation-promoted plasticity of the human brain. The Journal of Physiology, 597(16), 3985-4009.
Tyler, W. J., et al. (2015). Transdermal neuromodulation of noradrenergic activity suppresses psychophysiological and biochemical stress responses in humans. Scientific Reports, 5, 13865.
Arle, J. E., Carlson, K. W., & Mei, L. (2016). Investigation of mechanisms of vagus nerve stimulation for seizure using finite element modeling. Epilepsy Research, 126, 109-118.
Merrill, D. R., Bikson, M., & Jefferys, J. G. (2005). Electrical stimulation of excitable tissue: design of efficacious and safe protocols. Journal of Neuroscience Methods, 141(2), 171-198.
McIntyre, C. C., & Grill, W. M. (2002). Extracellular stimulation of central neurons: influence of stimulus waveform and frequency on neuronal output. Journal of Neurophysiology, 88(4), 1592-1604.
Yap, J. Y. Y., et al. (2020). Critical review of transcutaneous vagus nerve stimulation: Challenges for translation to clinical practice. Frontiers in Neuroscience, 14, 284.
Sluka, K. A., et al. (2013). What makes transcutaneous electrical nerve stimulation work? Making sense of the mixed results in the clinical literature. Physical Therapy, 93(10), 1397-1402.
Boon, P., et al. (2015). A prospective, multicenter study of cardiac-based seizure detection to activate vagus nerve stimulation. Seizure, 32, 52-61.
Keller, T., & Kuhn, A. (2008). Electrodes for transcutaneous (surface) electrical stimulation. Journal of Automatic Control, 18(2), 35-45.

\* cited by examiner

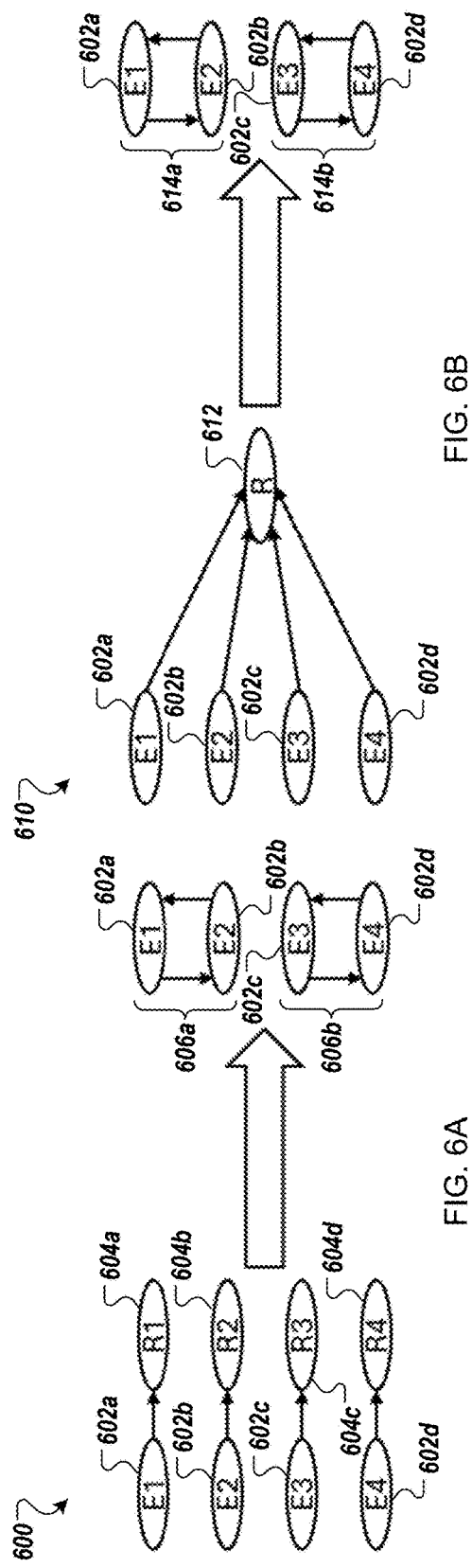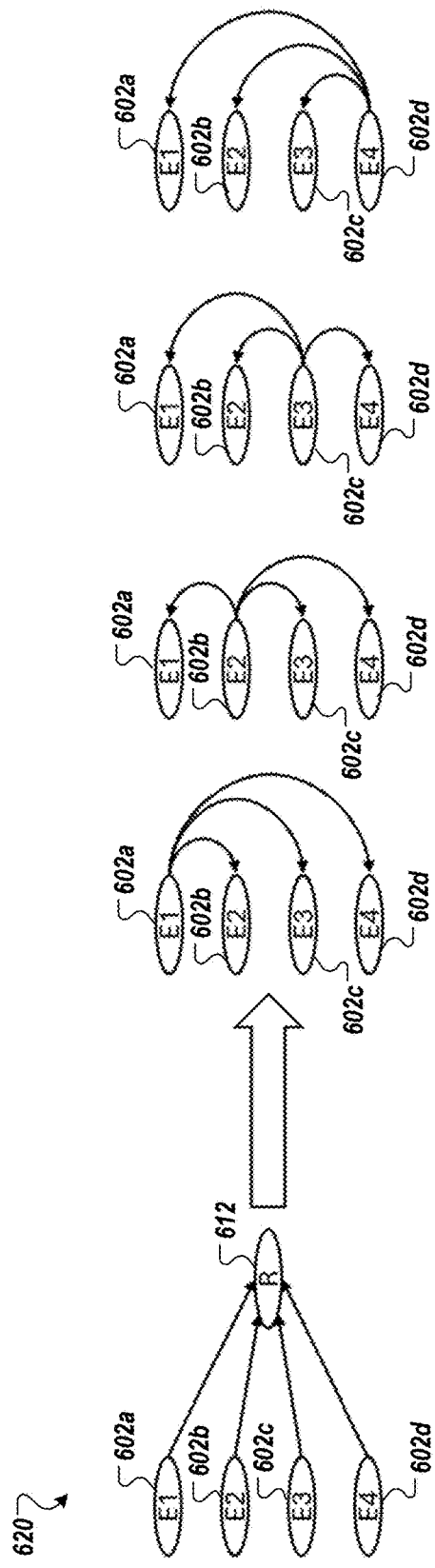

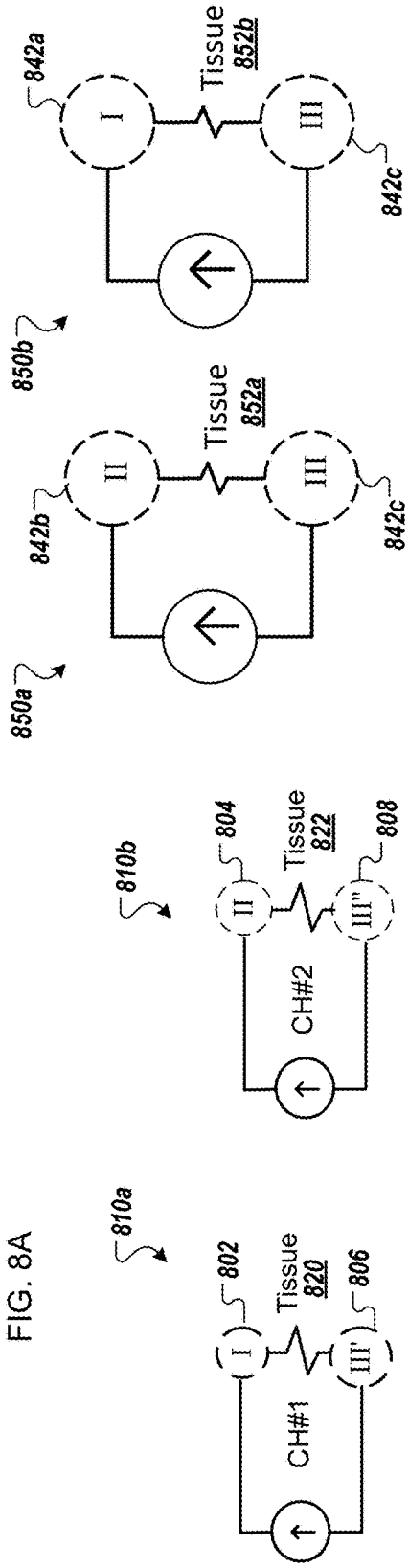
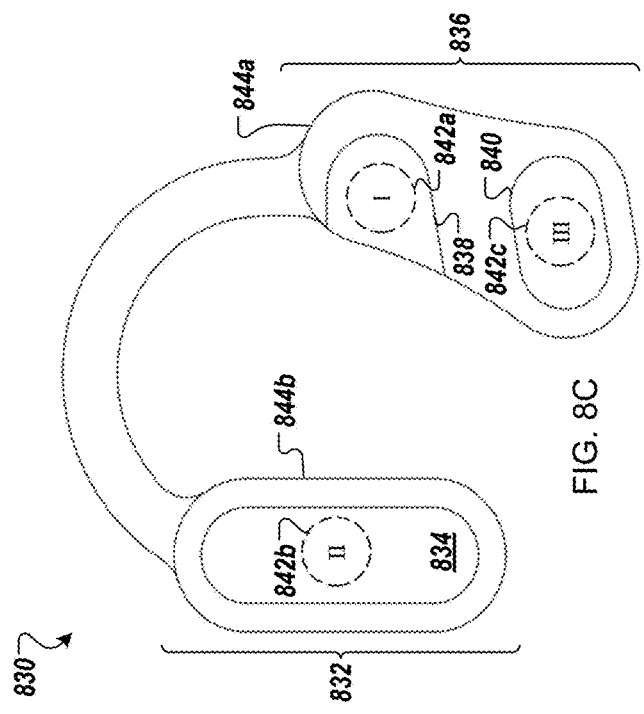
FIG. 8C
FIG. 8A
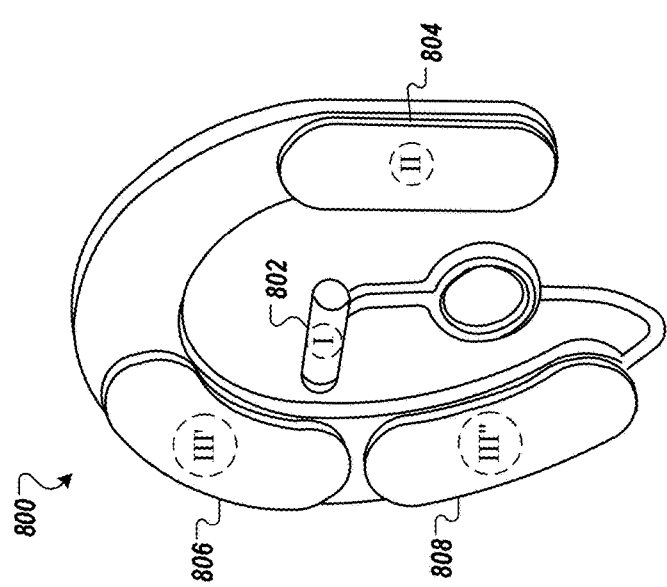
FIG. 8B

DELIVERY OF NON-PENETRATING ELECTRICAL NEUROSTIMULATION THERAPY

RELATED APPLICATIONS

This application is related to the following prior patents and patent applications by Spark Biomedical directed to stimulation therapies and stimulation devices: U.S. Pat. No. 12,029,893 entitled "Wearable Auricular Neurostimulator and Methods of Use" and issued Jul. 9, 2024; and U.S. Patent Application Publication No. 2024/0285944 entitled "Electrical Stimulation Methods and Devices for Improving Blood Management" and filed Feb. 21, 2024. The contents of each of the above-noted reference is hereby incorporated by reference in its entirety.

BACKGROUND

Electrical neuromodulation is a rapidly advancing field in neuroscience and biomedical engineering, offering therapeutic potential for various neurological and psychiatric disorders. This technique involves the application of electrical stimuli to specific neural targets to modulate neural activity and influence physiological processes. The efficacy of neuromodulation is largely dependent on the characteristics of the stimulating waveform, including pulse-width, frequency, and amplitude, as well as how the stimulation is presented.

In the context of non-penetrating skin electrodes, pain perception and user comfort are critical considerations for the successful implementation of neuromodulation therapies. The perception of pain and discomfort during electrical stimulation is closely related to the rate at which current is applied to the skin. Research has shown that rapidly increasing the amount of current in a stimulation pulse leads to a lower pain and discomfort threshold compared to a slower increase. The inventors recognized a need for new systems and methods designed to optimize the balance between effective stimulation and user comfort in non-invasive electrical neuromodulation applications.

SUMMARY OF ILLUSTRATIVE EMBODIMENTS

To address the challenges of pain and discomfort during therapy delivery, in on aspect, the present disclosure relates to novel ramping algorithms developed to optimize the balance between effective stimulation and user comfort in applying non-invasive neuromodulation. Various example ramping algorithms described herein employ a unique "step-up, step-down" approach to gradually increase the stimulation intensity while minimizing discomfort. Unlike traditional linear ramping methods, these algorithms increase the current amplitude in sets, with each set consisting of a subset of increases followed by a subset of decreases. Further, a short maintenance period may be added between each subset and/or between each set. Each step, for example, may involve an increase or decrease in current by a corresponding increase threshold amount or decrease threshold amount, depending on direction. Each change (e.g., step) in intensity level, in one example, may involve a difference corresponding to a gradation in setting of a neurostimulation device programmed with the algorithm. In illustration, an example auricular neurostimulation device may include a controller for selectively setting a target intensity level (e.g., waveform delivery defined by a target current and voltage) within a range from 1 mA to 50 mA, where the setting can be selected by any whole number (e.g., 1, 2, 3, ... 50). In this illustrative example, an up-down step pattern may result in a net increase in intensity of 1 mA from a prior intensity to a present intensity. Further, the up-down step pattern may be repeated until a target intensity is reached. Various step patterns are illustrated in FIG. 2A through FIG. 2H.

This novel up-down ramping approach allows for the delivery of a higher stimulation dose without compromising user comfort, potentially enhancing the therapeutic efficacy of non-invasive neuromodulation treatments. The effectiveness of various ramping algorithms described herein may be attributed to several factors. The alternating increase and decrease in intensity may allow for more efficient adaptation of sensory receptors. The periodic decreases in intensity, for example, may provide moments of relative relief, potentially reducing overall discomfort. The variable intensity pattern may help manage user expectations and reduce anxiety associated with stimulation. Additionally, the fluctuating intensity might engage different populations of nerve fibers, potentially promoting more robust neural response. Thus, this novel up-down ramping approach allows for the delivery of a higher stimulation dose without compromising user comfort, potentially enhancing the therapeutic efficacy of non-invasive neuromodulation treatments.

In one aspect, the present disclosure relates to a novel modulated waveform developed to enhance the efficacy and user experience of neuromodulation therapies. In illustrative embodiments, the modulated waveform combines traditional biphasic square pulses with a superimposed high-frequency signal. The base waveform, or "carrier," consists of biphasic square pulses with frequencies typically ranging from 1 to 150 Hz for stimulation of various neural targets, such as the auricular branch of the vagus nerve (e.g., preferentially stimulated between 1 and 30 Hz) or the auriculotemporal nerve (e.g., preferentially stimulated between 75 and 150 Hz).

In one aspect, the present disclosure relates to encoding two stimulation channels into a single channel using only two electrodes by leveraging the differential sensitivity of neural tissue to cathodic and anodic stimulation. With just a single pair of electrodes, for example, a neurostimulation device may be configured to independently control frequency, pulse-width, amplitude, and/or duty cycle for each neural target. The two-channels-in-one innovation allows for a simpler circuitry design with, potentially, a smaller device footprint. Further, reducing the total number of electrodes can lead to improved energy efficiency and improved patient comfort.

In one aspect, the present disclosure relates to providing a combination of the up-down ramping approach, the modulated waveform, and the two-channel-in-one approach, thereby enabling delivery of a larger dose of neurostimulation therapy while offering an improved comfort level to users via a device having a substantially reduced electronic footprint. This integrated approach represents a significant advancement in neuromodulation technology, offering the potential for more effective, efficient, and user-friendly treatments across a wide range of neurological and psychiatric disorders.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 6A through FIG. 6C illustrate example electrode configurations for use in two-channels-in-one stimulation;

FIG. 8A and FIG. 8B are diagrams representing of an electrode configuration and an equivalent circuit for providing therapy according to a first example;

FIG. 8C and FIG. 8D are diagrams representing of an electrode configuration and an equivalent circuit for providing therapy according to a second example;

DETAILED DESCRIPTION OF ILLUSTRATIVE EMBODIMENTS

Figure 1A:
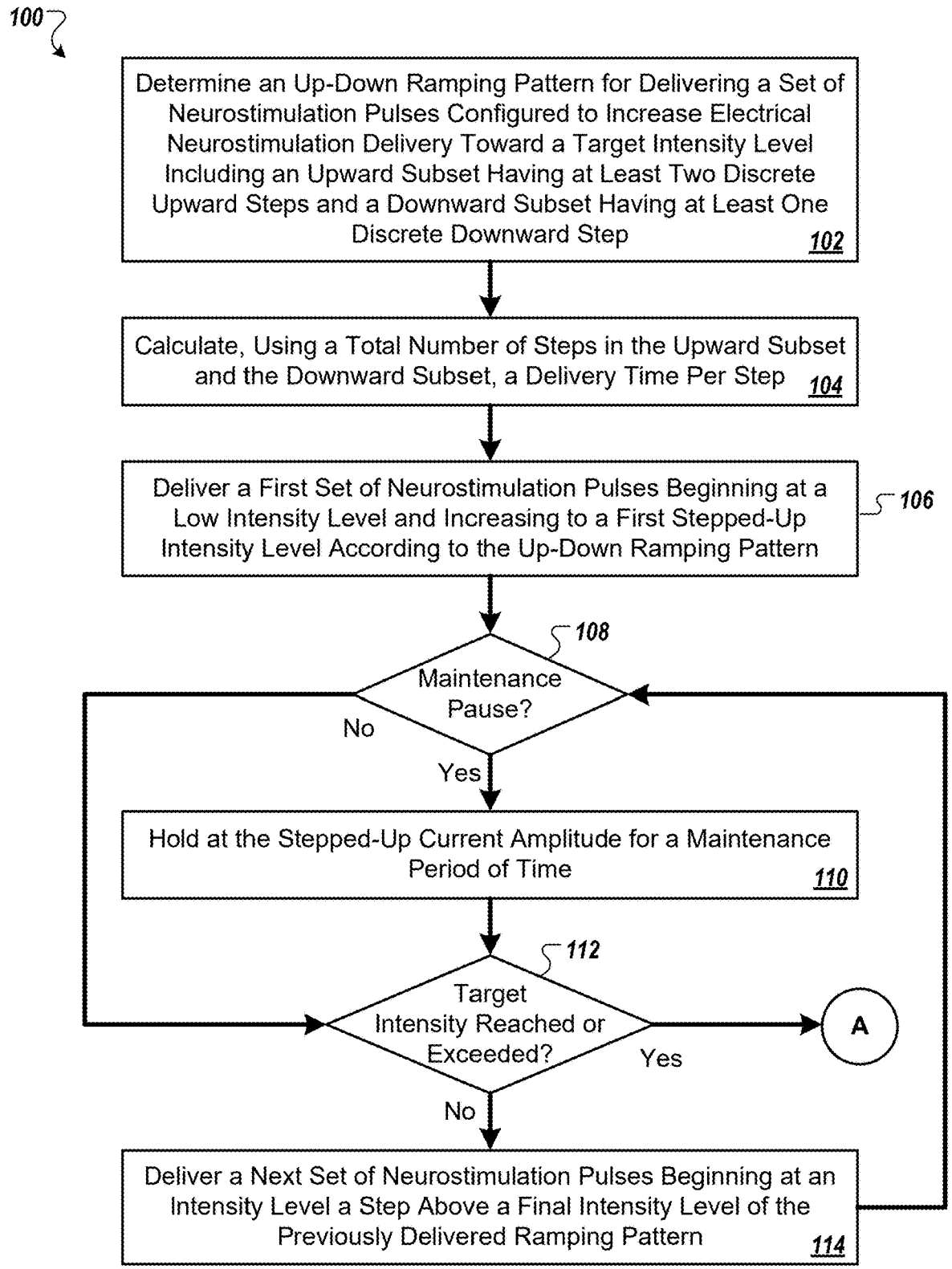
FIGS. 1A and 1B illustrate a flow chart of an example method for ramping up stimulation intensity to a target therapeutic setting.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Ramping Stimulation Delivery to Therapeutic Frequency Level

Figure 1B:
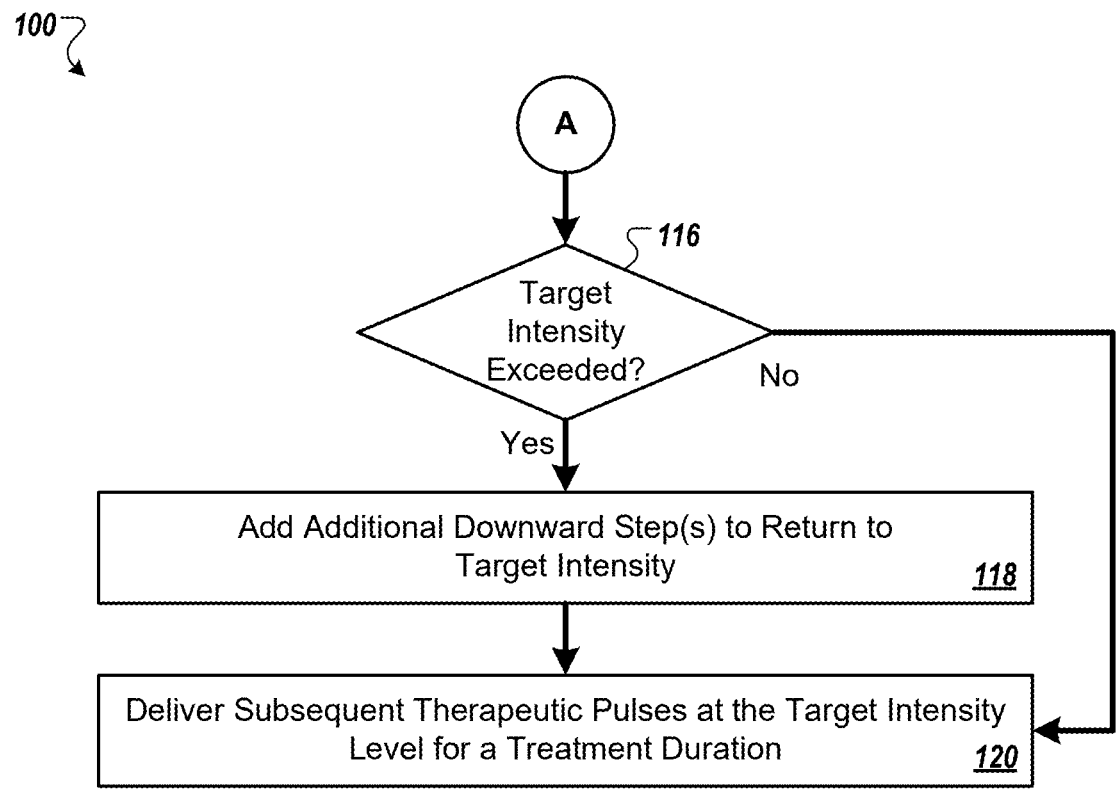

A flow chart of FIG. 1A and FIG. 1B illustrates an example method 100 for performing a ramping algorithm to increase stimulation intensity from a beginning (e.g., zero mA of current, zero V) value to a target intensity value. The method 100, for example, may be performed by the controller of a neurostimulation device, such as the multichannel pulse generator 750 of FIG. 7 and/or the therapy controller 974 of FIG. 9.

Figure 2A:
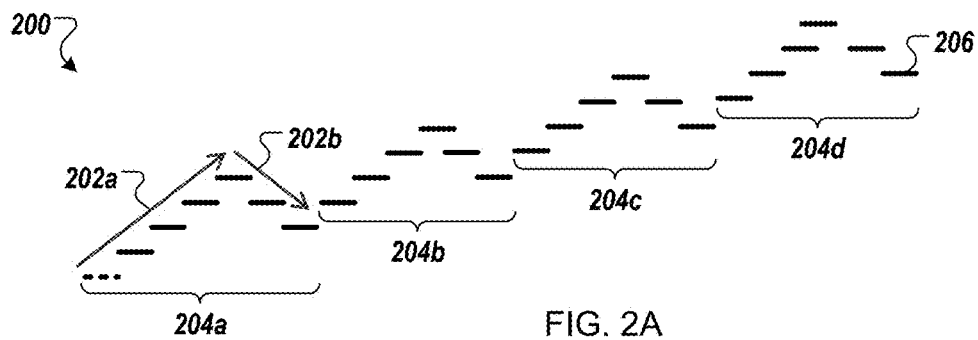
FIG. 2A through 2H illustrate example ramping patterns for ramping up stimulation intensity to a target therapeutic setting.
Figure 2B:
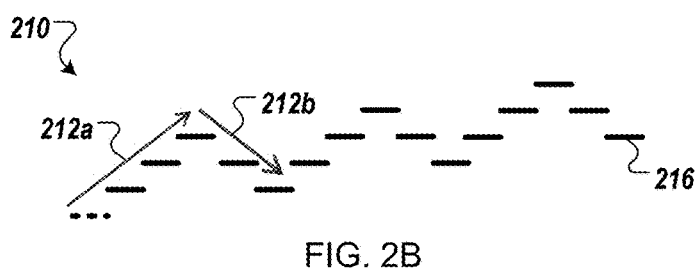
Figure 2C:
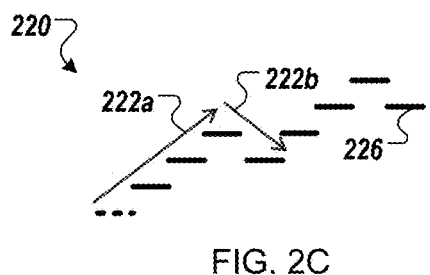
Figure 2D:
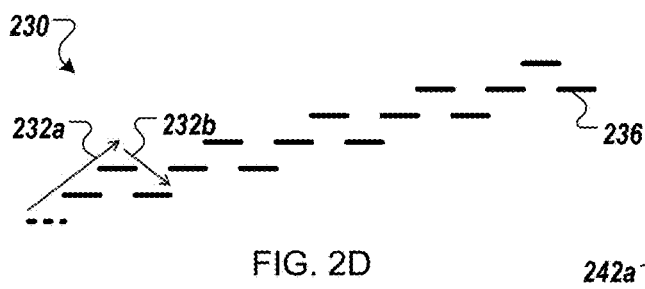

Turning to FIG. 1A, in some implementations, the method 100 begins with determining an up-down ramping pattern for delivering a set of neurostimulation pulses configured to increase electrical neurostimulation delivery toward a target intensity including an upward subset having at least two discrete upward steps and a downward subset having at least one discrete downward step (102). Turning to FIG. 2A, a first example ramping pattern 200 increases the amplitude by four steps in an upward subset 202a, then decreases the amplitude by two steps in a downward subset 202b in a first step pattern 202. The first example ramping pattern 200 proceeds with repeating the step pattern 202 until a target intensity 206 is reached. The first example ramping pattern 200 is an example of an even-even ramping pattern, where the intensity increases by an upward subset having an even number of steps, then decreases by a downward subset having an even number of steps. Turning to FIG. 2B, a second example ramping pattern 210 increases the amplitude by three steps in an upward subset 212a, then decreases the amplitude by two steps in a downward subset 212b in a second step pattern 212. The second example ramping pattern 210 proceeds with repeating the second step pattern 212 until a target intensity 216 is reached. The second example ramping pattern 210 is an example of an odd-even ramping pattern, where the intensity increases by an upward subset having an odd number of steps, then decreases by a downward subset having an even number of steps. A third example ramping pattern 220, illustrated in FIG. 2C, increases the amplitude by three steps in an upward subset 222a, then decreases the amplitude by one step in a downward subset 222b in a third step pattern 222. The third example ramping pattern 220 proceeds with repeating the third step pattern 222 until a target intensity 226 is reached. The third example ramping pattern 220 is an example of an odd-odd ramping pattern, where the intensity increases by an upward subset having an odd number of steps, then decreases by a downward subset having an odd number of steps. A fourth example ramping pattern 230, illustrated in FIG. 2D, increases the amplitude by two steps in an upward subset 232a, then decreases the amplitude by one step in a downward subset 232b in a fourth step pattern 232. The fourth example ramping pattern 230 proceeds with repeating the fourth step pattern 232 until a target intensity 236 is reached. The fourth example ramping pattern 230 is an example of an even-odd ramping pattern, where the intensity increases by an upward subset having an even number of steps, then decreases by a downward subset having an odd number of steps.

Returning to FIG. 1A, in some implementations, a delivery time per step is calculated using a total number of steps in the upward subset and the downward subset of steps (104). The number of sets of ramping patterns used to reach the target intensity can vary depending on the specific application and/or individual user sensitivity. For example, the timing of the ramping patterns may be based in part on a user's history of interactions with the stimulation device. The delivery time per step, for example, may be based at least in part on a therapeutic goal. Generally, stimulation may be delivered in and open-loop or closed-loop approach. Closed loop delivery may involve a feedback signal, which could be generated by an algorithm for example, fed by on-body contact or contactless sensors (e.g., EEG, EKG, cortisol sweat sensor, etc.) or by off-body devices such as a camera. In many closed-loop stimulation circumstances, fast ramping is preferred, and stimulation is provided for a short duration of time, such as less than a minute and in some cases for less than fifteen seconds. Further to the closed-loop delivery, stimulation may be repeated depending on the protocol or feedback received (e.g., via the same or different sensors or other monitoring device(s)). One scenario where stimulation may be applied for an extended period of time (e.g., for over one minute, over five minutes, at least ten minutes, etc.) yet a fast ramping protocol may be desired is when treating an acute stress reaction (ASR).

Further, the delivery time per step may be based on a target intensity (e.g., how many ramping patterns need to be applied to reach the target intensity). In a basic illustration where the ramping algorithm is designed to perform one up-down ramping pattern per second, for example, the stimulation intensity for each step of n steps of the ramping pattern may be held for 1/n seconds. In a second illustrative example involving a hold period (e.g., maintenance pause) between ramping patterns and/or between the upward subset of steps and the downward subset of steps, the maintenance time period (e.g., having a length of Xn, such as double the length of time of each step (e.g., 2n) may be factored in as one of the n steps (e.g., the maintenance step may be counted twice where it is double the length of the up/down steps).

The delivery time, in some embodiments, depends in part on the specific therapeutic application. In a first illustration, the therapeutic application may be a pair-plasticity paradigm, in which a training cue is used to trigger stimulation, thereby training or retraining a neural network. The pair-plasticity paradigm, for example, may be employed to learn a new task or to recover from injury (e.g., stroke). When a training cue triggers stimulation, the timing of the stimulation onset and achieving target intensity is of key concern. In a second illustration in which a fast ramping is desirable, the therapeutic stimulation may be configured for increasing attention and/or alertness. In such scenarios, it may be desirable to apply a swift ramping algorithm to rapidly reach the target intensity, for example by applying the entire ramping pattern to reach the target intensity in less than 150 milliseconds, in certain embodiments preferably under 100 milliseconds. On the other hand, a slow ramping may be preferred in scenarios in which stimulation is designed to be applied over longer periods of time, for example for five minutes or longer. Slow ramping, for example, may involve an increase in intensity of one step pattern (e.g., upward subset plus downward subset of steps) over a timeframe of one second. In this manner, total ramping time may be performed in around twenty to forty-five seconds, or in about thirty seconds (e.g., to cover a range of intensity of about 30 mA). Slow ramping, for example, may be applied when treating different types of withdrawal (e.g., opioids, alcohol, antidepressants, tobacco, etc.), as well ailments such as depression, migraine, chronic pain, inflammation, hemostatic/coagulation acceleration (e.g., to decrease menstrual, surgical, and/or trauma bleeding, or in bleeding disorders such as hemophilia Von Willebrand Disease (VWD), etc.). In further examples, slow ramping and sustained therapeutic stimulation may be appropriate in applications related to general cognitive performance, general stress, and/or anxiety.

In some implementations, a first set of neurostimulation pulses beginning at a low intensity level and increasing to a first stepped-up intensity level is delivered according to the up-down ramping pattern (106). The first set of neurostimulation pulses, for example, may begin at a low threshold current (e.g., a "step" above zero, such as 1 mA). In another example, the first neurostimulation pulse may be delivered at a starting threshold set to a value anticipated to be comfortable for immediate delivery to a patient, such as, in some examples, under 5 mA or under 10 mA. The starting threshold, for example, may depend in part on whether the therapy is being delivered swiftly (e.g., responsive to an internal (biophysical) or external (environmental) trigger) or slowly (e.g., when the entire therapy session will be performed over an extended period of time, such as, in some examples, at least 5 minutes, at least 10 minutes, or at least 20 minutes). In illustration, when therapy is meant to be delivered swiftly, a higher starting threshold may be selected.

In some implementations, if a maintenance pause is included in the ramping pattern (108), the stepped-up intensity level may be held for a maintenance period of time (110). The maintenance pause, for example, may be built into the ramping pattern as a longer timed step, positioned between ramping patterns.

Figure 2E:
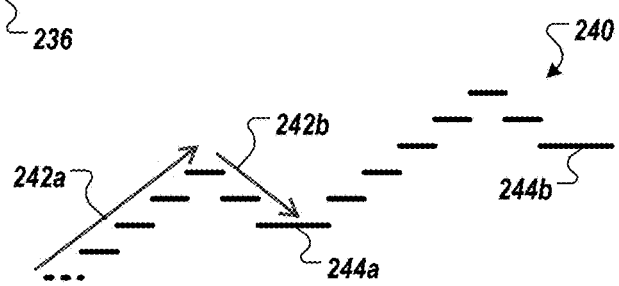

Turning to FIG. 2E, in some embodiments, a maintenance pause 244 is installed at the end of each ramping pattern of an example ramping algorithm 240, extending the delivery of the intensity level corresponding to the last downward step of the ramping pattern. Extending intermediate intensity levels prior to reaching target intensity, for example, can provide a smoother transition (up/down/rest) for the wearer. As illustrated, the maintenance pauses 244*a*, 244*b* are double in length of the other steps of the ramping pattern 240, while the steps in each of an upward subset 242*a* and a downward subset 242*b* are identical in length. In other embodiments, the maintenance pause time may differ, for example 1.5× the length of the other steps, 3× the length of time of the other steps, etc.

Returning to FIG. 1A, in some implementations, it is determined whether the target intensity for therapeutic stimulation delivery has been reached or exceeded (112). In some examples, a total length of ramping time, a total number of sets of ramping patterns, and/or the target intensity itself may be tracked by the method 100.

While still ramping toward the target intensity (112), in some implementations, a next set of neurostimulation pulses is delivered, beginning at an intensity step above a final intensity level of the previously delivered ramping pattern (114). As illustrated in FIG. 2A, for example, four ramping patterns 204*a-d* are delivered to reach the target intensity 206.

Turning to FIG. 1B, if the target intensity is met or exceeded (112), it is determined whether the target intensity has been exceeded (116). In some embodiments, the method 100 temporarily overshoots the target intensity, reaching the target intensity level after one or more downward steps. In other embodiments, the method 100 may cease in delivering stimulation accruing to the up-down ramping pattern upon reaching the target intensity level. The method 100 may be designed to overshoot the target intensity by at least a threshold buffer to provide for a progressive adaptation of sensory receptors while avoiding sustained high-intensity stimulation that might lead to discomfort. Reaching the target intensity after the last step-down from an exceedance threshold level, for example, allows the wearer to experience stimulation at a higher intensity and, thus, as experimentally observed, stimulation at the target intensity feels relatively more comfortable than if the maximum level of stimulation experienced is the actual target intensity.

Figure 2F:
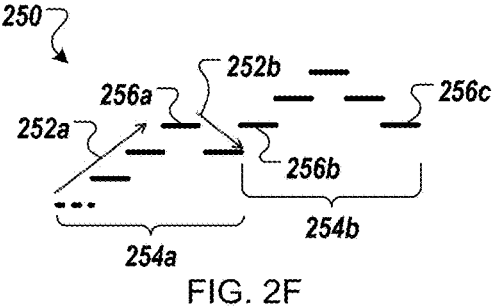

In some implementations, if the target intensity has been exceeded (116), one or more additional downward steps are added to return to the target intensity (118). Turning to FIG. 2F, an example ramping pattern 250 includes three steps in an upward subset 252*a* followed by one step in a downward subset 252*b* of the repeating up-down ramping pattern. In the illustrative example, rather than terminating the ramping algorithm of the example ramping pattern 250 at the top of an upward subset 252*a* which naturally ends at a first instance 256*a* of a target intensity 256, the example ramping pattern 250 repeats the up-down ramping pattern again, adding a second downward step to a second up-down ramping pattern 254*b* to achieve the target intensity 256*c*.

Figure 2G:
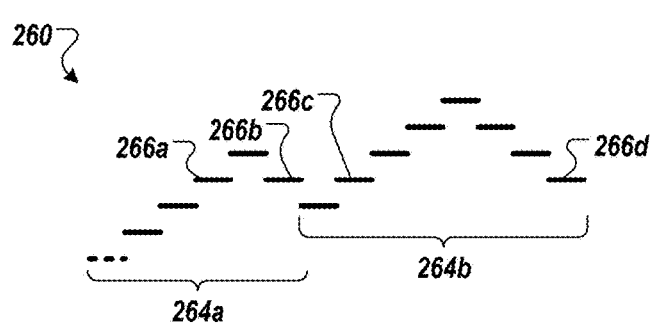

In another illustrative example, turning to FIG. 2G, even though a first up-down ramping pattern 264 reaches a target intensity level 266 on both the upward subset of steps (instance 266*a*) and the downward subset of steps (instance 266*b*) in a first up-down ramping pattern 264*a*, to allow for greater exceedance of the target intensity 266 (e.g., by three steps rather than by a single step), an example ramping pattern 260 includes a second up-down ramping pattern 264*b*, including an extra final step 266*d* to reach the target intensity for a final time. Exceeding by greater than a single step, for example, may allow for a more noticeable relative comfort level of the target intensity 266.

Returning to FIG. 1B, in some implementations, once target intensity has been reached for a final time (116/118), subsequent therapeutic pulses may be delivered at the target intensity level for a treatment duration (120). For example, the therapy may be designed to last for a set period of time (e.g., fifteen seconds, twenty seconds, thirty seconds, one minute, under five minutes, under ten minutes, up to a half hour, etc.) and/or until a target condition has been reached (e.g., sensors monitoring the wearer determine that a trigger condition no longer exists). In some embodiments involving longer periods of therapeutic stimulation (e.g., greater than three minutes, greater than five minutes, greater than ten minutes, etc.), a rest period (e.g., fifteen seconds, thirty seconds, one minute, etc.) between blocks of stimulation may be provided. After the end of each rest period, the same up-down ramping pattern or a different up-down ramping pattern may be used to return the wearer to the target intensity (or a new target intensity, depending on therapeutic goal).

Figure 2H:
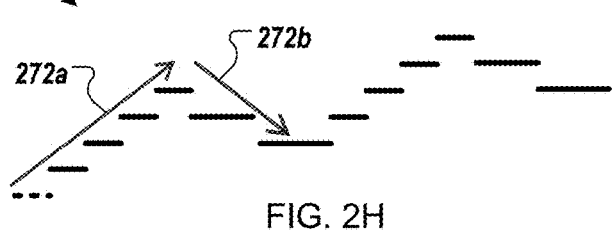

Although the operations are illustrated as being performed in a particular order, in other embodiments, certain operations of the method 100 may be performed in a different order and/or concurrently. Additionally, although described as a particular set of operations, in other embodiments, the method 100 may include more or fewer operations. For example, rather than including a decision regarding maintenance pauses (108), in some embodiments, different up-down ramping patterns may simply have steps designed to be performed for varying lengths of time. In illustration, turning to FIG. 2H, an example ramping pattern 270 includes an upward subset of steps 272*a* including four steps, each designed to be performed for a first duration of time. Further, the example ramping pattern 270 includes a downward subset of steps 272*b* included two steps, each designed to be performed for a second duration of time longer than the first duration of time (e.g., for double the duration). In this manner, the although the intensity drop of the downward subset 272*b* is half that of the intensity gain provided by the upward subset 272*a*, each of the upward subset 272*a* and the downward subset 272*b* may last for a same duration of time. Other modifications of up-down ramping patterns are possible, such as differences in gaps between intensity level (e.g., ramp up by 1 mA each step, ramp down by 0.5 mA each step, etc.).

Figure 3A:
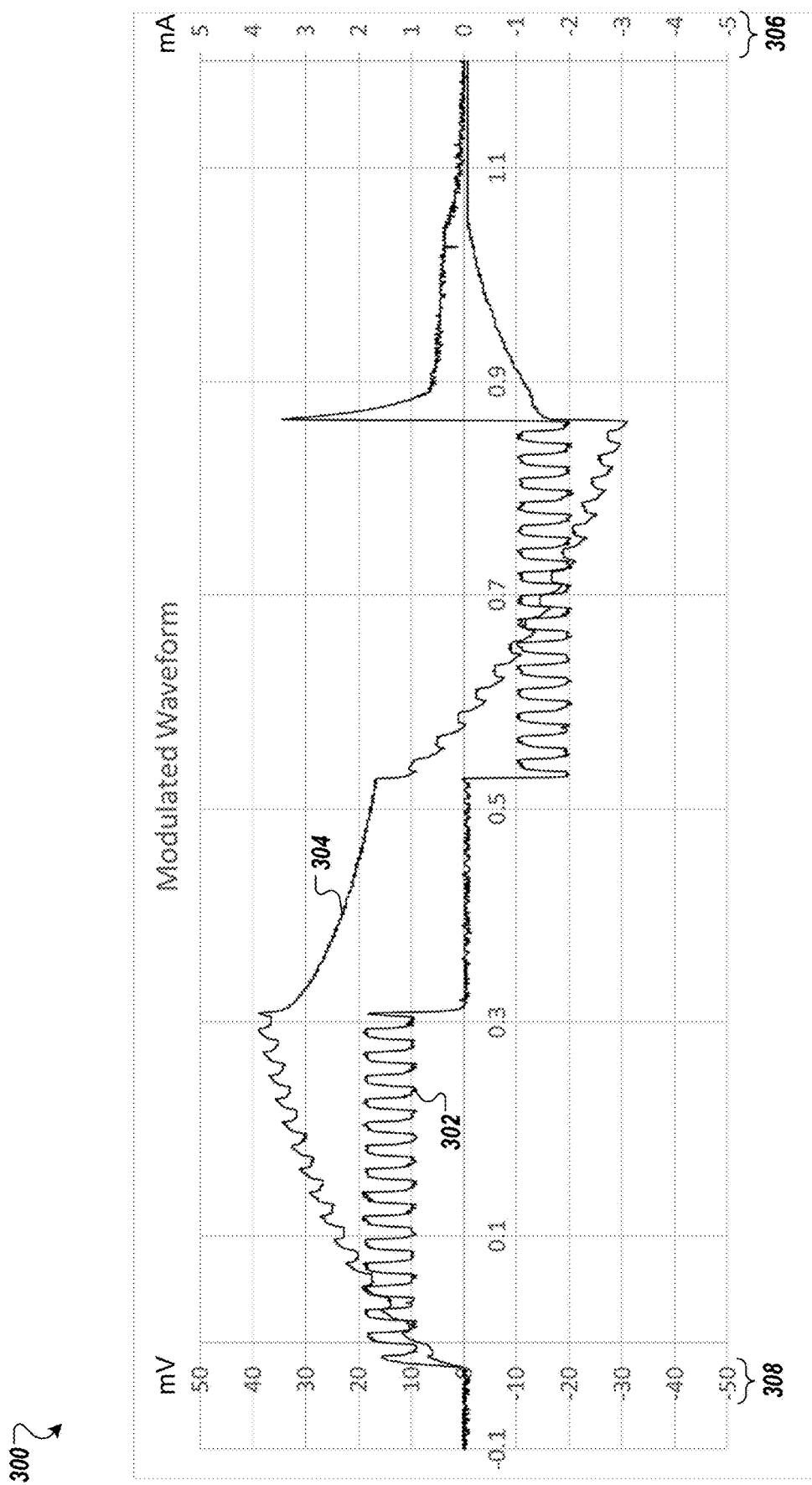
FIG. 3A illustrates a modulated waveform for improving therapeutic delivery of neurostimulation pulses.
Figure 3B:
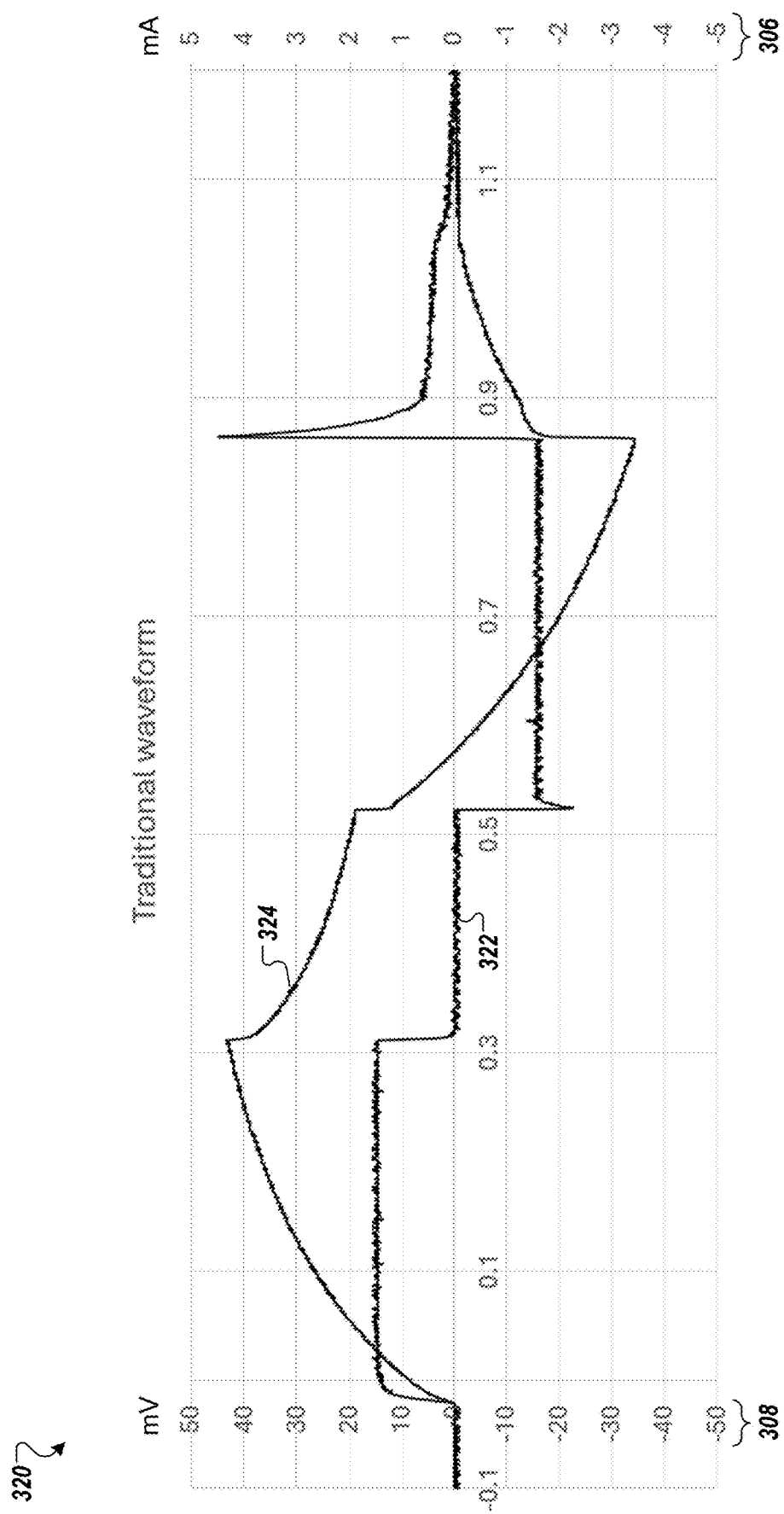
FIG. 3B through FIG. 3E illustrate a series of graphs demonstrating comparisons between unmodulated and modulated waveforms for delivering neurostimulation therapy.

Modulated Waveform for Enhancing Therapeutic Efficacy of Neurostimulation Treatment Turning to FIG. 3A, a graph 300 of an example modulated waveform is presented in both a current plot 302 (e.g., in milliamperes 306) and a voltage plot 304 (e.g., in millivolts 308). The modulated waveform is designed to provide enhanced efficacy and user experience to neuromodulation therapies. For ease of comparison, turning to FIG. 3B, a graph 320 of an example traditional waveform (e.g., the example waveform of FIG. 3A without the modulation) is presented, including an unmodulated current plot 322 and an unmodulated voltage plot 324. Each of the graphs 300 of FIG. 3A and 320 of FIG. 3B illustrate signals produced by stimulating nerves around the ear of a human using non-piercing cutaneous electrodes. The innovative aspect of the modulated waveform is the addition of a high-frequency signal "riding" on biphasic square pulses (e.g., as can be discerned in the current plot 302). The modulated waveform may be used in delivering neurostimulation therapy, including during a step up/step down ramping period of time when increasing stimulation intensity to a target intensity, as described in relation to the method 100 of FIG. 1A and FIG. 1B.

Figure 3C:
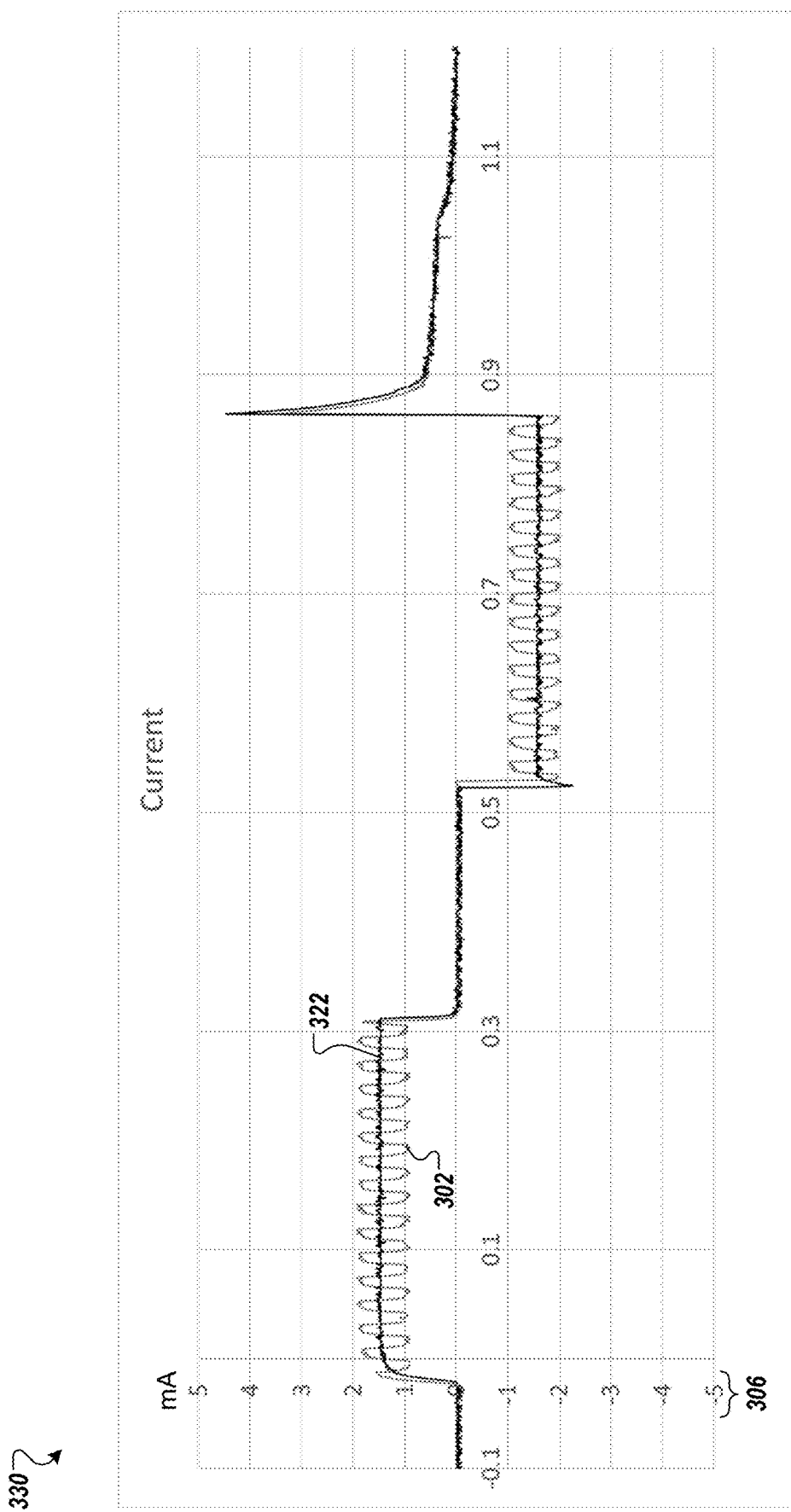

In some implementations, the high-frequency signal component of the biphasic square pulses operates in the range of 10 to 75 kHz, with its peak-to-peak (p-p) amplitude set as a percentage (e.g., 10-200%) of the carrier waveform's amplitude. Advantageously, this high-frequency signal is designed to maintain a substantially similar average current as the original square waveform, ensuring that the overall charge delivery remains similar to a square waveform with an amplitude equal to the average amplitude of the modulated signal. A visual comparison of current illustrated in a graph 330 of FIG. 3C, for example, demonstrates the high-frequency modulated current plot 302 is generally bisected by the unmodulated current plot 322 such that the high-frequency modulated current plot 302 appears to maintain a substantially similar average current as the unmodulated current plot 322. For example, if a square wave signal has an amplitude of 4 mA, then a corresponding modulated waveform delivered at 50 kHz and a p-p amplitude set at 60% of the square wave (i.e., 2.4 mA) then the modulated wave would oscillate at 50 kHz between 2.8 and 5.2 mA, i.e., a p-p amplitude of 2.4 mA with an average of approximately 4 mA depending on duty cycle of the oscillating signal. For a precise duty cycle of 50%, in another example, the average would be exactly 4. However, as long as the charge is balanced (e.g., by a following inverted pulse) maintaining a precise and consistent 50% duty cycle is not therapeutically relevant nor necessary. However, given all other variables are the same, the charge delivered per phase by both the modulated and non-modulated waveforms would be substantially similar (e.g., within less than 5% difference) when the amplitude of the non-modulated waveform is set to same value as the average intensity of the modulated waveform.

The incorporation of the high-frequency signal into the modulated waveform offers two primary advantages. First, the high-frequency modulation has been observed to reduce proprioception, in particular nociception—the sensation of stimulation by the user, especially pain sensation. By reducing sensory feedback and thus increasing the user's comfort level toward the stimulation, therapy adherence and overall treatment efficacy may be improved.

As a second advantage, in many cases, the addition of the high-frequency component allows for a lower compliance voltage to deliver a similar amount of charge. For example, turning to FIG. 3D, an example graph 340 is presented, comparing the modulated voltage plot 304 of FIG. 3A to the unmodulated voltage plot 324 of FIG. 3B. The p-p voltage using the modulated waveform 304, modulated at –45 kHz with the amplitude set at –67% of the corresponding square wave, is 69.6 mV. In comparison, the unmodulated voltage plot 324 has a p-p voltage of 77.5 mV, resulting in approximately a ten percent reduction in voltage when using the modulated waveform in comparison to the unmodulated waveform.

Figure 3D:
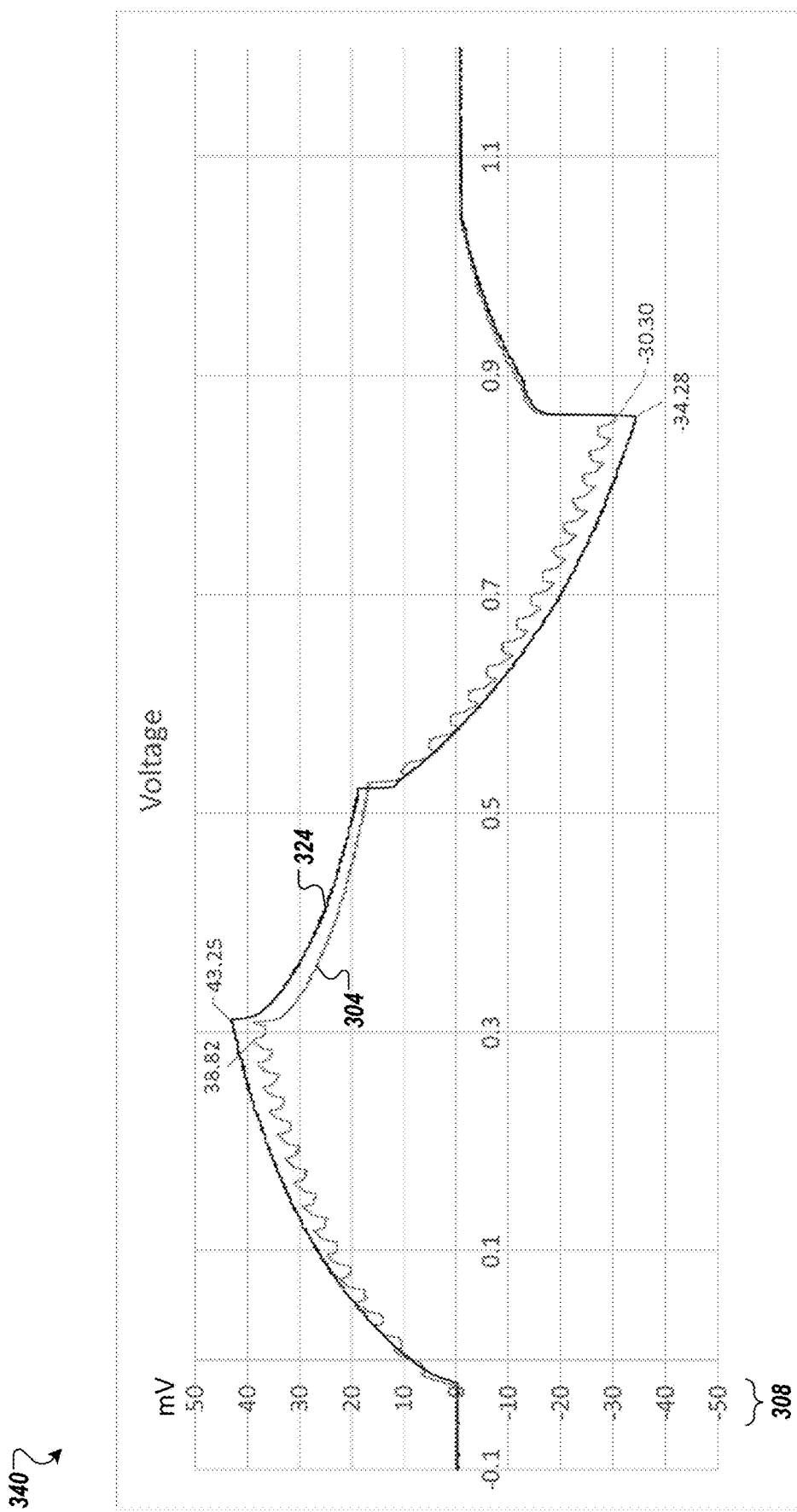
Figure 3E:
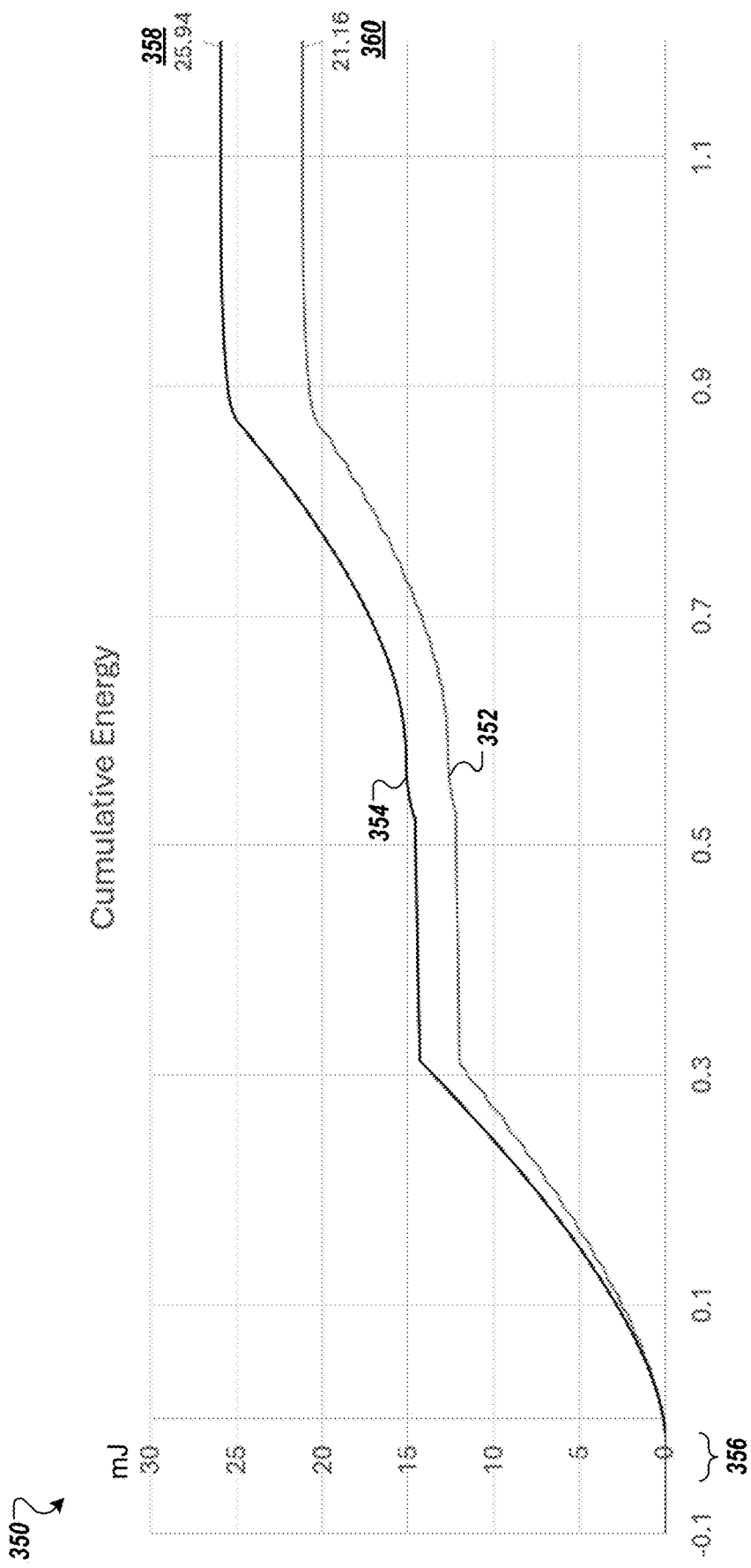

This reduction in the voltage required to pass the current for stimulating a wearer of a neurostimulation device suggests an overall lower impedance, translating to lower energy consumption. Lower energy consumption is particularly desirable for portable and implantable devices where battery life is a critical consideration. Turning to FIG. 3E, for example, a graph 350, produced under the same circumstances as the graph 340 of FIG. 3D, illustrates cumulative energy expended in producing both the modulated waveform in a modulated energy plot 352 and the unmodulated waveform in an unmodulated energy plot 354 in view of energy in millijoules 356. As illustrated in FIG. 3E, the total energy expended using a modulated waveform is approximately 19% lower (e.g., 21.16 mJ 358 vs. 25.94 mJ 360) compared with a non-modulated signal. The above energy percentage drop could be different depending on, amongst other factors, the pulse-width used. The percentage difference, for example, may be between ten percent and thirty percent or higher if the pulse-width is extremely long (e.g., two milliseconds per phase) and the pulse is delivered as a constant current pulse. Total energy savings, however, should further take into consideration the additional energy needed by the pulse generator to generate the modulated waveform. Depending on the circuitry switching efficiency, for example the total energy savings seen as a battery life extension may be up to 20% lower than the energy savings seen at the point of delivery (e.g., as illustrated in FIG. 3E. In illustration, if the energy delivered to the wearer to generate the stimulation signals during therapy is 30% lower when modulated than when unmodulated, the corresponding battery life extension achieved in providing a modulated waveform is anticipated to be at least a 24% improvement in comparison to delivering an unmodulated waveform.

The mechanism behind the above-described pair of primary benefits likely relates to the complex interaction between the high-frequency signal and tissue impedance. For example, without being bound to a theory, the rapid oscillations of the high-frequency component of the modulated waveform may help to overcome the capacitive elements of the electrode-tissue interface more efficiently, allowing for improved charge delivery at lower voltages. Furthermore, the reduced proprioception may be attributed to the selective activation of nerve fibers. The nerves carrying the stimulation signals are generally small diameter unmyelinated fibers. The high-frequency component might preferentially stimulate larger diameter fibers while minimizing the activation of smaller pain and sensory fibers, leading to a more comfortable sensation for the user.

This novel waveform design represents a significant step forward in neuromodulation technology, potentially offering improved energy efficiency and user comfort without compromising therapeutic efficacy. When combined with an up-down ramping algorithm for reaching target intensity, it allows for the delivery of higher stimulation doses while maintaining user comfort and reducing power consumption.

Two-Channels-in-One Electrical Stimulation Technique

To further optimize neurostimulation delivery, a novel "two-channels-in-one" approach has been developed. This innovative technique encodes two stimulation channels into a single channel using only two electrodes, leveraging the differential sensitivity of neural tissue to cathodic and anodic stimulation. The key principle of this approach is the utilization of the lower stimulation threshold of nerves to cathodic pulses compared to anodic pulses. The two-channels-in-one mechanism for stimulation delivery, for example, may be compared to traditional stimulation channels described below in relation to FIG. 8B, FIG. 8D, and FIG. 8F. Advantageously, this approach allows for independent control of stimulation parameters (frequency, pulse-width, amplitude, and duty cycle) for each neural target, despite using a single pair of electrodes.

Figure 4A:
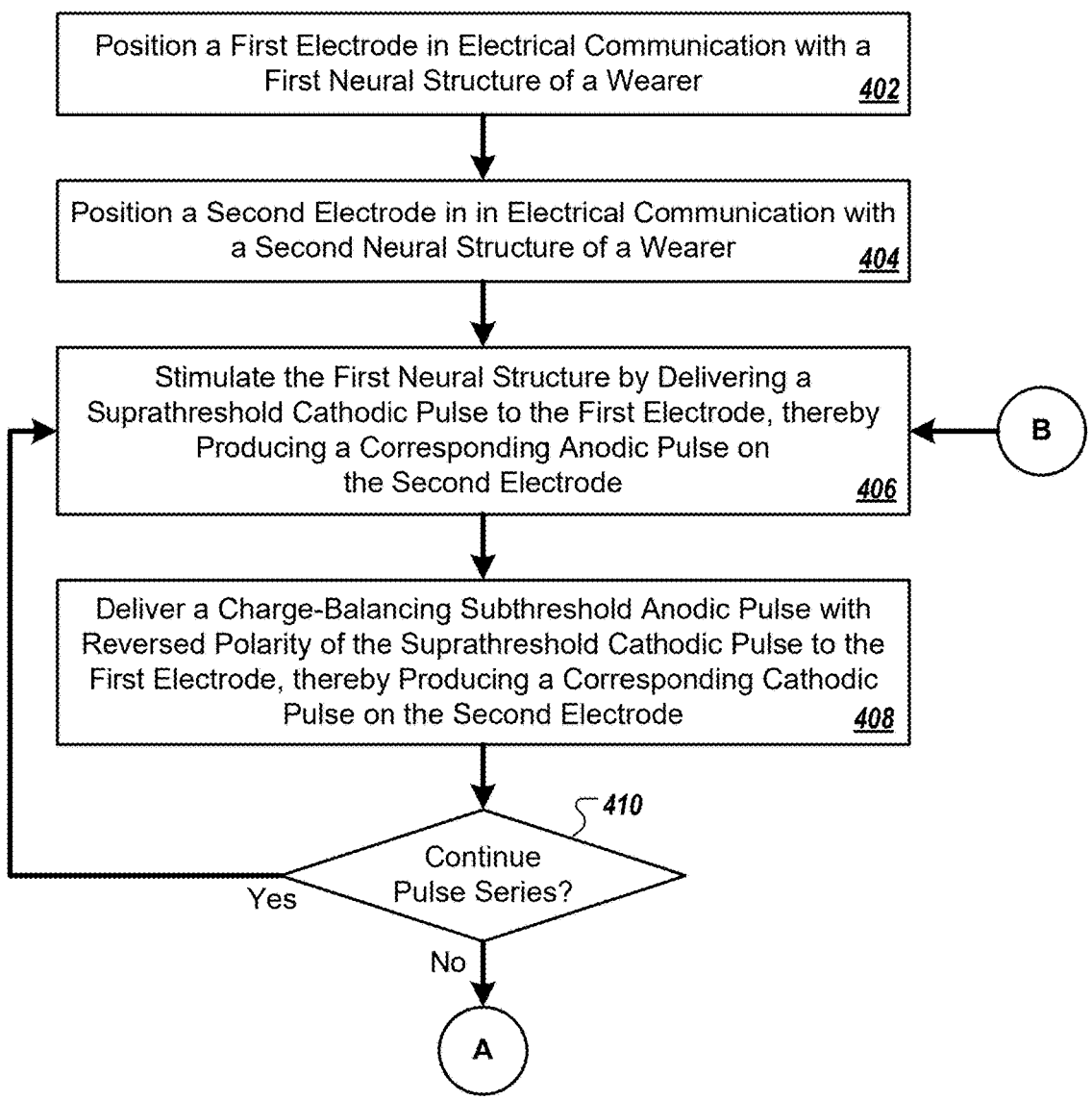
FIG. 4A and FIG. 4B illustrate a flow chart of an example method for providing two-channels-in-one stimulation via electrodes of a neurostimulation device.
Figure 4B:
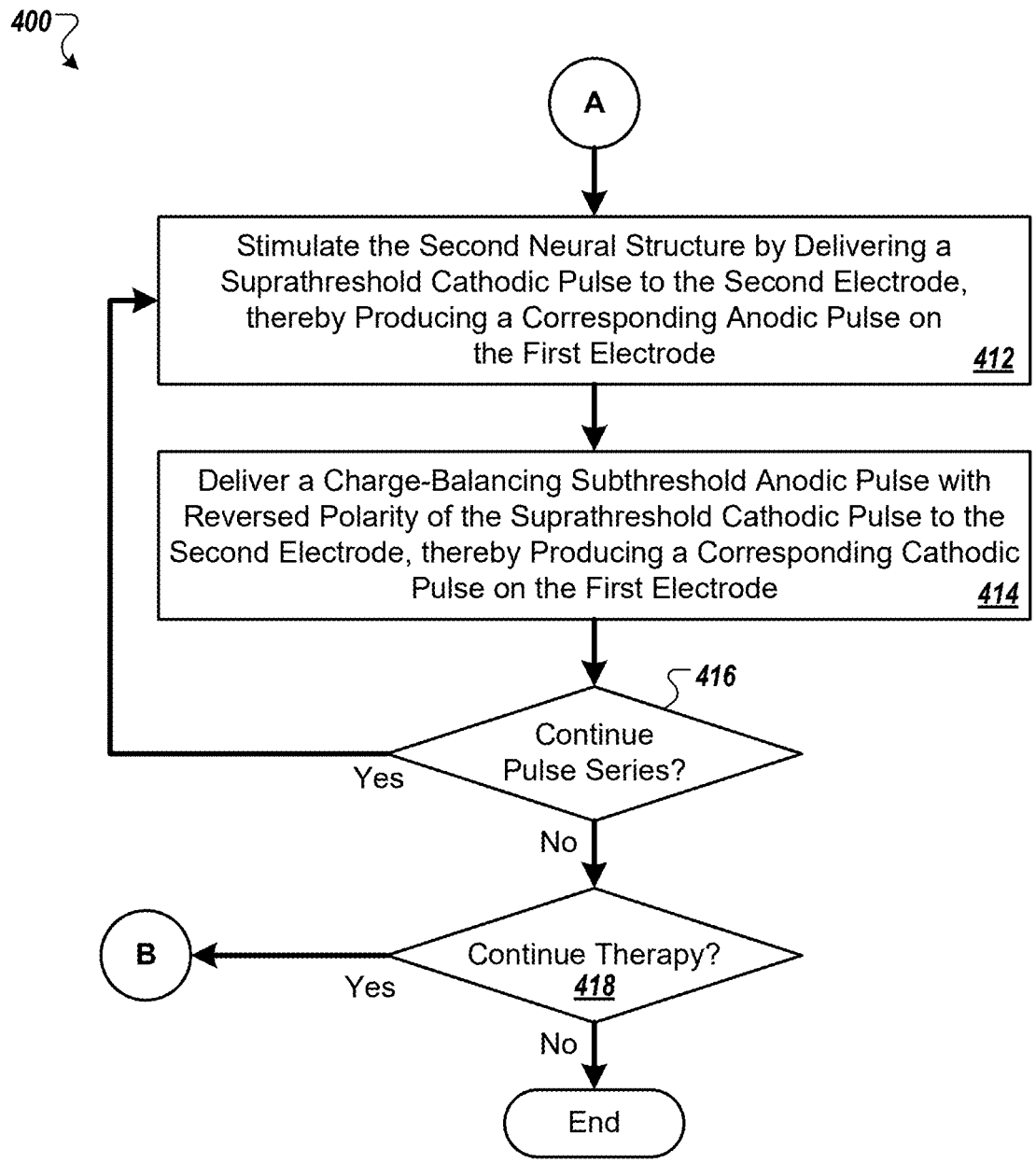

Turning to FIG. 4A and FIG. 4B, a flow chart illustrates an example method 400 for delivering neurostimulation therapy using encoded two-channels-in-one electrode stimulation. To stimulate two target neural structures, a traditional multi-channel stimulation typically requires at least four electrodes (two per channel) or three electrodes with a common return. The method 400 achieves dual-channel functionality using only two electrodes, potentially reducing device complexity. The potential benefits of this technique include reduced hardware complexity and cost, smaller device footprint, improved energy efficiency, enhanced selectivity of stimulation, and potential for improved patient comfort due to fewer electrodes. The method 400, for example, may be performed using an auricular neurostimulation device such as an example device 800 of FIG. 8A, an example device 830 of FIG. 8C, and/or an example device 860 of FIG. 8E, described in greater detail below.

Turning to FIG. 4A, in some implementations, the method 400 begins with positioning a first electrode in electrical communication with a first neural structure of a wearer (402). The first electrode, in illustration, may be one of the electrodes 802, 804, 806, or 808 of the auricular stimulation device 800 of FIG. 8A, one of the electrodes 842a, 842b, or 842c of the neurostimulation device 830 of FIG. 8C, or one of the electrodes 870a, 870b, or 870c of the neurostimulation device 860 of FIG. 8E. The first electrode, for example, may be included in a neurostimulation device pressed against the skin of the wearer and/or adhered to the skin of the wearer. The first electrode, for example, may be in electrical communication with the first neural structure via a first tissue region of the wearer's skin. The electrical communication, for example, may be enhanced using a conductive gel. Positioning the first electrode, in additional examples, may involve piercing the first tissue region with a percutaneous electrode or implanting a stimulation device including the first electrode (e.g., an electrode cuff). The first neural structure, in some examples, may be related to or in communication with vagal related neural structures, auriculotemporal nerve structures, neural structures related to the lesser occipital nerve, or neural structures related to the great auricular nerve.

In some implementations, a second electrode is positioned in electrical communication with a second neural structure of the wearer (404). The second electrode, in illustration, may be one of the electrodes 802, 804, 806, or 808 of the auricular stimulation device 800 of FIG. 8A, one of the electrodes 842a, 842b, or 842c of the neurostimulation device 830 of FIG. 8C, or one of the electrodes 870a, 870b, or 870c of the neurostimulation device 860 of FIG. 8E. The second electrode, for example, may be included in a neurostimulation device pressed against the skin of the wearer and/or adhered to the skin of the wearer. The second electrode, for example, may be in electrical communication with the second neural structure via a second tissue region of the wearer's skin. The electrical communication, for example, may be enhanced using a conductive gel. Positioning the second electrode, in additional examples, may involve piercing the second tissue region with a percutaneous electrode or implanting a stimulation device including the second electrode (e.g., an electrode cuff).

The second neural structure, in some examples, may be related to or in communication with vagal related neural structures, auriculotemporal nerve structures, neural structures related to the lesser occipital nerve, or neural structures related to the great auricular nerve.

In some implementations, the first neural structure is stimulated by delivering a suprathreshold cathodic pulse to the first electrode, thereby producing a corresponding anodic pulse on the second electrode (406). A suprathreshold pulse, for example, refers to a pulse delivered at an intensity beyond a smallest stimulus intensity threshold T configured to elicit a neural response at the first neural structure using a cathodic pulse. In comparison, the corresponding anodic pulse on the second electrode is less likely to activate the neural tissue in its vicinity due to the higher threshold for anodic stimulation. The suprathreshold cathodic pulse, for example, may be delivered by a pulse generator, such as the pulse generator 750 described in relation to FIG. 7. The suprathreshold cathodic pulse, for example, may be delivered via the first electrode 765a to first target tissue 748a of FIG. 7.

Figure 5A:
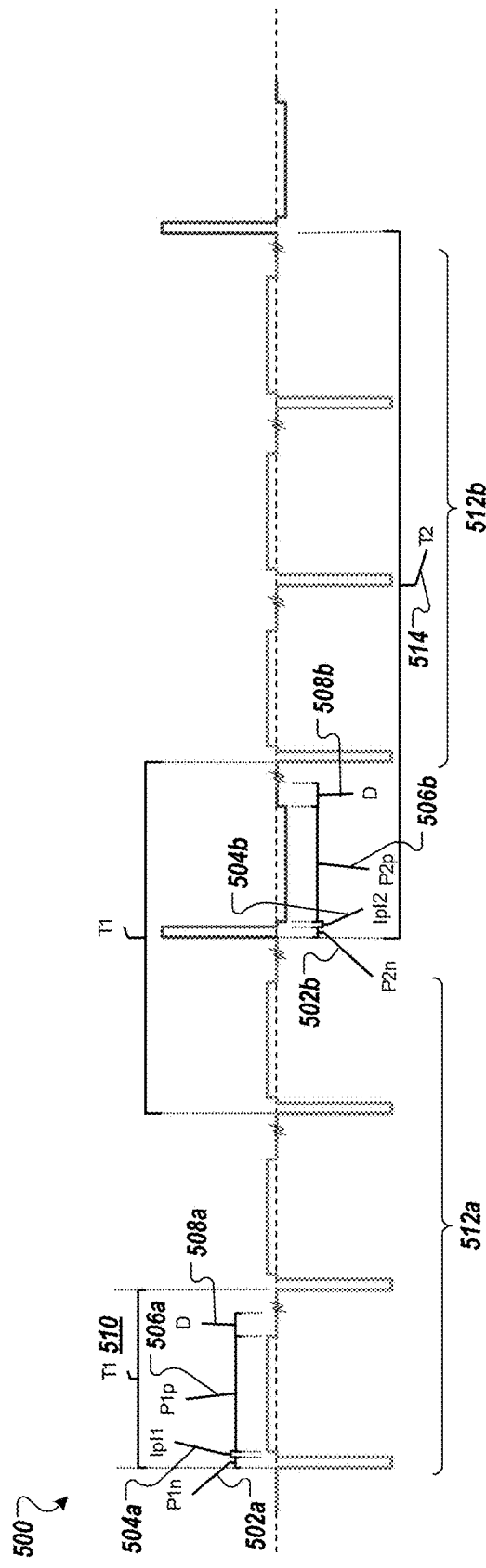
FIG. 5A and FIG. 5B illustrate a pulse diagram and coordinating example test circuit demonstrating pulse mechanisms of the two-channels-in-one stimulation.
Figure 5B:
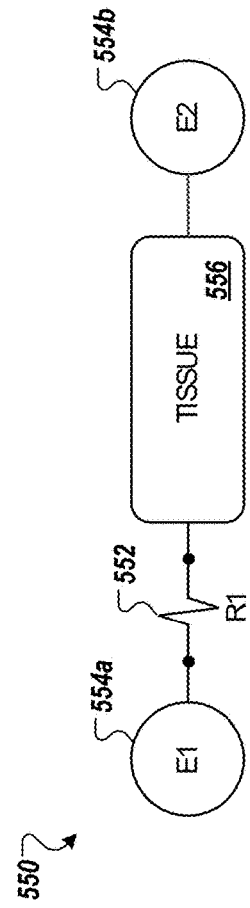

Turning to FIG. 5A, a pulse diagram 500 illustrates example stimulation pulses. The stimulation pulses of the pulse diagram 500, for example, may be delivered to an example test circuit 550 of FIG. 5B, including a pair of electrodes 554a, 554b in electrical communication with tissue 556. The pulse diagram 500, for example, represents electrical signals as would be observed using an oscilloscope connected to the example test circuit 550, with probes across a resistor R1 552 and the positive probe positioned closer to a first electrode E1 554a. The pulses of the pulse diagram 500, for example, may begin with a first negative suprathreshold cathodic pulse P1n 502a delivered to a first tissue region of the tissue 556 by the first electrode E1 554a, targeting the first neural structure.

Returning to FIG. 4A, in some implementations, a charge-balancing subthreshold anodic pulse with reversed polarity of the suprathreshold cathodic pulse is delivered to the first electrode, thereby producing a corresponding cathodic pulse on the second electrode (408). In order to balance the charge, the subthreshold anodic pulse, for example, may have a longer pulse-width than the suprathreshold cathodic pulse; however, the AUC for both cathodic and anodic pulses should be substantially the same. For example, if the amplitude of the subthreshold anodic pulse is 25% of that of the suprathreshold cathodic pulse, then its duration would need to be four times longer, etc. The corresponding cathodic pulse on the second electrode has substantially lower amplitude than the charge-balancing pulse, such that neural tissue is not activated near either of the first and second electrodes responsive to the charge-balancing subthreshold anodic pulse. The charge-balancing subthreshold anodic pulse may be delivered after an inter-pulse interval, such as an inter-pulse interval IpI1 504a of FIG. 5A.

Turning to FIG. 5A, the inter-pulse interval IpI1 504a, for example, may represent a minimum interval between polarity switching from the negative suprathreshold cathodic pulse P1n 502a and a first positive subthreshold anodic pulse P1p 506a delivered to the first electrode 554a. As illustrated, a pulse-width of the first positive subthreshold anodic pulse P1p 506a is substantially longer than the pulse-width of the first negative suprathreshold cathodic pulse P1n 502a. The combined pulse-widths of the first negative suprathreshold cathodic pulse P1n 502a and the first positive subthreshold anodic pulse P1p 506a, along with intervals between (e.g., the inter-pulse interval IpI1 502a as well as a period between polarity inversion D 508), establishes a period T1 510 of the pulses to the first electrode E1 554a (e.g., the inverse of the frequency of the pulses delivered to the first electrode E1 554a).

Returning to FIG. 4A, in some implementations, the stimulation pairs of suprathreshold cathodic pulses (406) and subthreshold anodic pulses of reverse polarity (408) continue to be delivered to the first electrode (410) for a duration of the pulse series delivered via the first channel of the two-channels-in-one stimulation mechanism. As illustrated in FIG. 5A, for example, a series of three pulses 512 may be delivered to the first electrode E1 between each pulse delivered to the second electrode E2 554b.

Once the pulse series duration has concluded (410), turning to FIG. 4B, in some implementations, the second neural structure is stimulated by delivering a suprathreshold cathodic pulse to the second electrode, thereby producing a corresponding anodic pulse on the first electrode (412). The suprathreshold cathodic pulse, for example, may be delivered by a pulse generator, such as the pulse generator 750 described in relation to FIG. 7. The suprathreshold cathodic pulse, for example, may be delivered via the second electrode 765b to first target tissue 748b of FIG. 7.

Turning to FIG. 5A, the pulses of the pulse diagram 500, after the series of three pulses 512a, illustrates a second negative suprathreshold cathodic pulse P2n 502b delivered to a second tissue region of the tissue 556 by the second electrode E2 554b, targeting the second neural structure.

Returning to FIG. 4A, in some implementations, a charge-balancing subthreshold anodic pulse with reversed polarity of the suprathreshold cathodic pulse is delivered to the second electrode, thereby producing a corresponding cathodic pulse on the first electrode (414). The subthreshold anodic pulse, for example, may have a longer pulse-width than the suprathreshold cathodic pulse, for example to balance an area beneath the pulse with that of the suprathreshold cathodic pulse. The corresponding cathodic pulse on the second electrode has substantially lower amplitude than the charge-balancing pulse, such that neural tissue is not activated near either of the first and second electrodes responsive to the charge-balancing subthreshold anodic pulse. The charge-balancing subthreshold anodic pulse may be delivered after an inter-pulse interval, such as a second inter-pulse interval IpI2 504b of FIG. 5B.

Turning to FIG. 5A, the inter-pulse interval IpI2 504b, for example, may represent a minimum interval between polarity switching from the negative suprathreshold cathodic pulse P2n 502b and a second positive subthreshold anodic pulse P2p 506b delivered to the second electrode 554a. As illustrated, a pulse-width of the second positive subthreshold anodic pulse P2p 506b is substantially longer than the pulse-width of the second negative suprathreshold cathodic pulse P2n 502b. The combined pulse-widths of the second negative suprathreshold cathodic pulse P2n 502b and the second positive subthreshold anodic pulse P2p 506b, along with intervals between (e.g., the inter-pulse interval IpI2 502b as well as a second period between polarity inversion D 508b) and the intervening pulses delivered to the first electrode 512b, establishes a period T2 514 of the pulses to the second electrode E2 554b (e.g., the inverse of the frequency of the pulses delivered to the first electrode E2 554b).

Returning to FIG. 4A, in some implementations, the stimulation pairs of suprathreshold cathodic pulses (412) and subthreshold anodic pulses of reverse polarity (414) continue to be delivered to the second electrode (416) for a duration of the pulse series. As illustrated in FIG. 5A, for example, only a single pulse is delivered to second first electrode E1 before returning to continuing to deliver a series of three pulses to the first electrode E1 554a.

In general, the terms suprathreshold and subthreshold are used to describe whether neuronal tissue is activated or not. A suprathreshold stimulus refers to one that is strong enough to generate an action potential in neural tissue, while a subthreshold stimulus is insufficient to do so. However, when it comes to transcutaneous stimulation (e.g., using cutaneous non-penetrating electrodes) the complexity, heterogeneity, and variability of human tissue can lead to instances where some neural tissue is activated by a stimulus that would typically be considered subthreshold. In this context, subthreshold, as used herein, refers to a pulse with an intensity and duration that activates a significantly smaller volume of neural tissue (no more than 25% of the original volume) compared to a fully suprathreshold stimulus. Essentially, only a small portion of the tissue receives sufficient stimulation to trigger an action potential.

The amount of electrical charge required to activate neural tissue is influenced by how quickly that charge is delivered. The faster the charge is delivered, the lower the activation threshold. For instance, if a given neural tissue can be activated with a charge of 10 nC using a 250 µs pulse, a longer pulse duration of 500 µs would require more than 10 nC to trigger the same activation. The actual difference in the required charge depends on the specific type of tissue, following a well-established relationship known as the Strength-Duration curve which, when expressed in terms of charge, is then referred to as the Charge-Duration curve.

Figure 10:
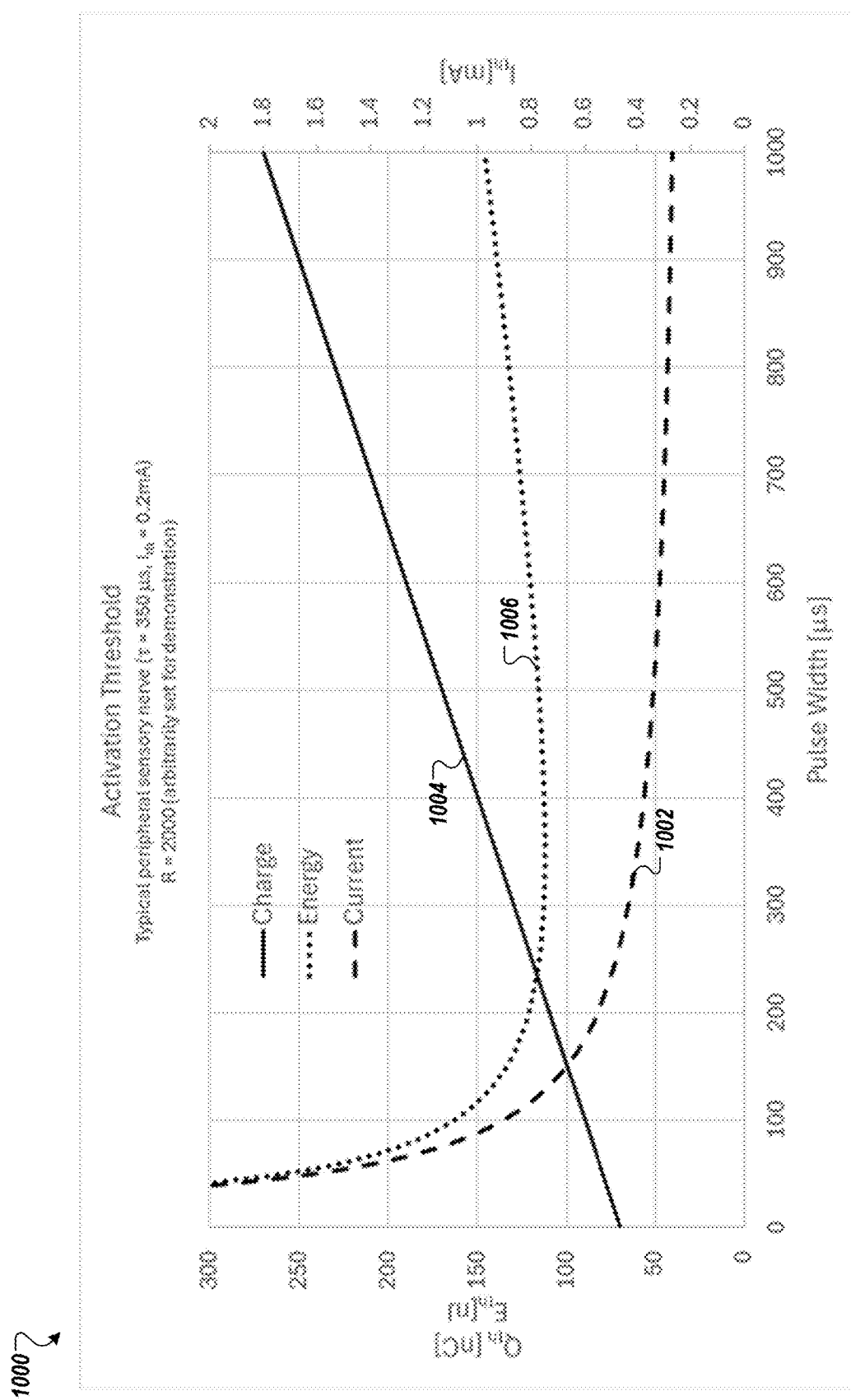
FIG. 10 illustrates an example strength-duration graph.

FIG. 10 illustrates an example graph 1000 demonstrating a typical Strength-Duration curve 1002 illustrating the current activation-threshold as a function of pulse-width, a typical Charge-Duration curve 1004 illustrating the charge activation-threshold as a function of pulse-width, and a typical Energy-Duration curve 1006 illustrating the energy activation-threshold as a function of pulse-width for a typical peripheral sensory nerve. The current, charge, and energy as illustrated by the curve would be applied in the vicinity of the target neural tissue including the peripheral sensory nerve to achieve neural activation. The peripheral sensory nerve, for example, may demonstrate chronaxie ti (i.e., the minimum time required for activation at the minimum energy threshold) of 350 µs with a current activation threshold $I_{th}$ h of 0.2 mA. A pulse-width close to the chronaxie is often used to conserve energy.

The formulas for each curve are as follows:
Strength—Duration:

$$I_{th} = I_{rh}\left(1 + \frac{\tau}{PW}\right)$$

Charge—Duration:

$$Q_{th} = I_{rh} \cdot PW\left(1 + \frac{\tau}{PW}\right) \text{ or } Q_{th} = Q_{min}\left(1 + \frac{\tau}{PW}\right)$$

Energy:

$$E = I_{th}^2 \cdot \frac{(PW + \tau)^2}{PW} \cdot R$$

where $I_{th}$ is the Rheobase current (minimum activation current); PW is the pulse-width;; $Q_{th}$ is the Charge at the activation threshold; and $Q_{min}$ is the minimum charge needed for activation. To generate the curves 1002, 1004, and 1006, impedance R was arbitrarily set to 2000 Ohms. For illustration purposes a pure resistive tissue is assumed. In application, the distance between the neural target and the site of charge injection greatly influences the actual charge or current thresholds.

In embodiments of the present disclosure, a subthreshold pulse is used to balance the charge delivered by the suprathreshold pulse. Ideally, the total charge delivered by both pulses should be as similar as possible. The total charge (Q) is calculated as the product of current (i) and pulse-width (PW): Q=i×PW. To maintain substantially the same charge when current decreases, the pulse-width must increase proportionally. Since the subthreshold pulse has a significantly lower current than the suprathreshold pulse, its pulse-width must be correspondingly longer. For example, consider a suprathreshold pulse with a width of 250 µs. If the subthreshold pulse current is set to 25% of the suprathreshold current, its pulse-width must be four times longer (1000 µs) to deliver the same charge.

Figure 11:
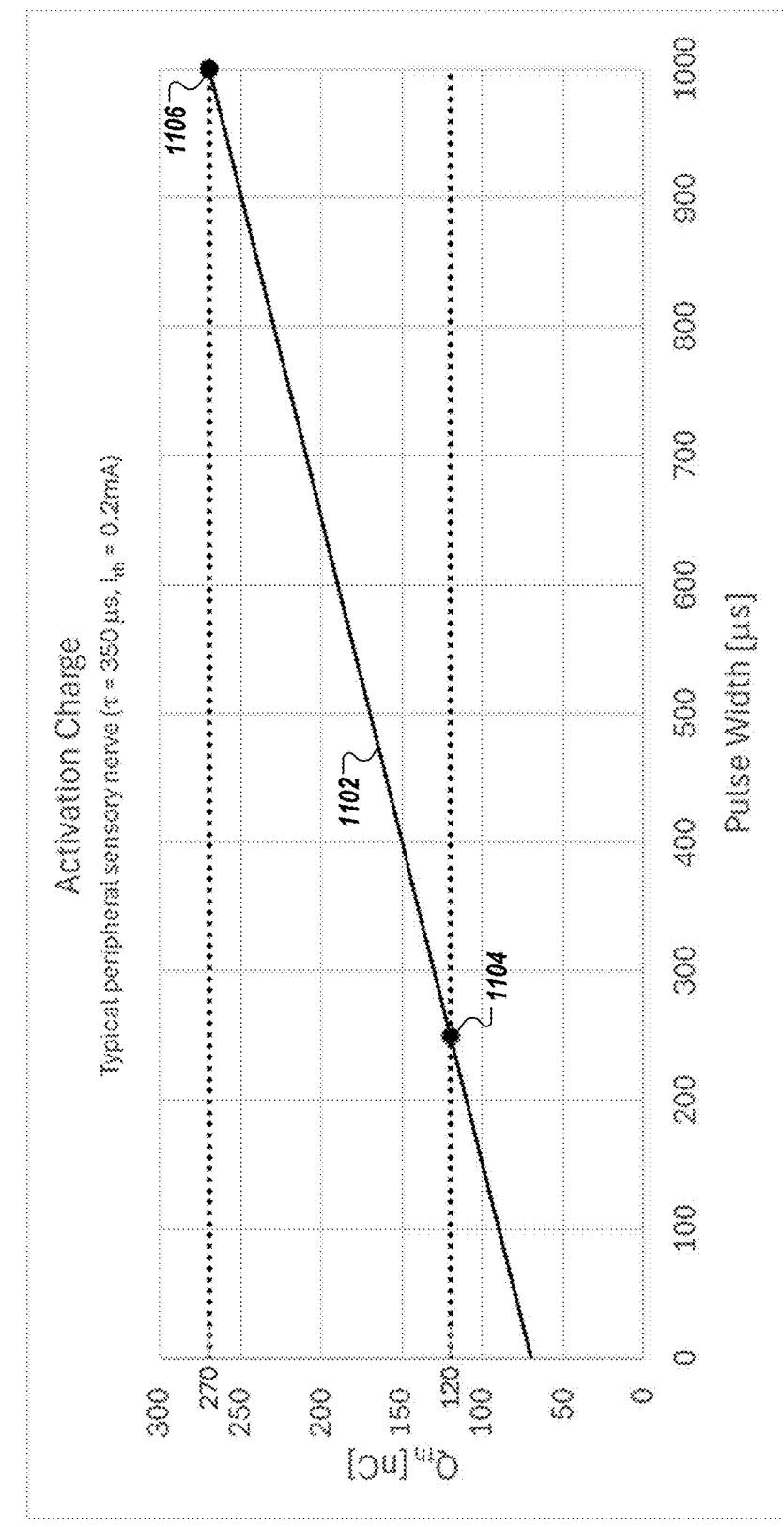
FIG. 11 illustrates an example charge-duration graph.

Turning to FIG. 11, an example charge-duration curve graph 1100 shows the charge threshold in the vicinity of the neural tissue to activate a typical peripheral sensory nerve ($\tau$=350 µs, $I_{th}$=0.2 mA). The charge in the vicinity of the neural tissue greatly depends on the total amount of charge delivered by the stimulating electrodes, the distance between the electrode and the neural tissue, and the type of tissue between the electrode and the neural tissue. Although just an example, the graph 1100 reflects the general relationship between the activation threshold of a given neural tissue and the pulse duration or pulse-width used to deliver the charge to stimulate that given tissue. For example, FIG. 11 demonstrates that for a given neural tissue, the activation threshold 1102 is reached when 120 nC of charge is delivered within 250 µs 1104. However, if the pulse-width is extended to 1000 µs, more than double the charge (270 nC) 1106 is required to reach the activation threshold 1102. This principle ensures that the subthreshold pulse, despite delivering the same charge as the suprathreshold pulse over a longer duration, will not activate this tissue.

In various embodiments, the current of the subthreshold pulse compared to the suprathreshold pulse is set to different ranges: Between 50% and 25%, between 25% and 10%, between 25% and 20%, between 10% and 5%, and in yet another embodiment below 5%. The pulse-width of the subthreshold pulse may be consistently adjusted to maintain substantially the same charge as the suprathreshold pulse, following the equation Q=i×PW. For instance, if the subthreshold current is set to 25% of the suprathreshold current, the subthreshold pulse-width should be set to 400% (1/25%) of the suprathreshold pulse-width.

TABLE 1

Typical Chronaxie and Rheobase Values for Excitable Tissue

| Excitable Tissue | Typical values | |
| --- | --- | --- |
| neuronal and muscular | Chronaxie | Rheobase |
| Peripheral Motor Nerves | 50-100 µs | 0.2-0.5 mA |
| Peripheral Sensory Nerves | 200-700 µs | 0.1-0.3 mA |
| Skeletal Muscle | 1-10 ms | 1-5 mA |
| Cardiac Muscle | 2-4 ms | 0.2-0.5 mA |
| Smooth Muscle | 10-100 ms | 5-20 mA |
| Central Nervous System Neurons | 0.1-1 ms | 0.1-1 nA Highly variable |
| Retinal Ganglion Cells | 1-2 ms | 10-50 µA |
| Auditory Nerve Fibers | 200-300 µs | 0.1-0.3 mA |
| Vestibular Nerve Fibers | 100-200 µs | 0.2-0.4 mA |
| Cortical Neurons | 0.1-0.3 ms | 0.1-1 nA Highly variable |

Further, in some implementations, as long as the therapy continues with delivery of the interleaved stimulation patterns to the first electrode and the second electrode (418), the method 400 repeats.

As the method repeats, it may be noted that, in following the pattern of cathodic and anodic pulses, the next target electrode would usually have had an anodic pulse just prior to being targeted with a cathodic pulse. Advantageously, it has been found that delivering an anodic pulse prior to the cathodic pulse assists in lowering the stimulation threshold for the subsequent cathodic pulse, a phenomenon known as anodic preconditioning.

Although described as a particular set of operations, in other embodiments, the method 400 may include more or fewer operations. For example, the method may include a first up-down ramping pattern stimulation cycle where the step pattern of the algorithm is interleaved to each of the first and second electrodes prior to proceeding with therapeutic stimulation. Further to the example, the up-down ramping pattern may be interleaved in a manner that provides for a rest (e.g., up 2, down 1, rest 3) on one of the electrodes while performing the active stimulation step pattern on the other electrode (e.g., such as the rest periods described in relation to FIG. 2E). Additionally, if the electrodes have already been positioned (e.g., during a prior therapy or during implantation), the positioning operations 402, 404 may not be performed. Although the method 400 is illustrated as a particular series of operations, in further embodiments, certain operations may be performed in a different order or concurrently. For example, the positioning operations 402, 404 may occur in the opposite order or concurrently. Other modifications of the method 400 are possible.

FIG. 6A through FIG. 6C illustrate example electrode configurations for use in two-channels-in-one stimulation. The electrode configurations include dedicated return electrode configurations of FIG. 6A as well as single return electrode configurations of FIG. 6B and FIG. 6C.

Turning to FIG. 6A, in a first example electrode configuration, a neurostimulation device may include a set of four therapeutic electrodes: E1 602a, E2 602b, E3 602c, and E4 602d. As illustrated, each of the therapeutic electrodes 602a-d is paired with a separate return electrode: therapeutic electrode E1 602a with return electrode 604a, therapeutic electrode E2 602b with return electrode 604b, therapeutic electrode E3 602c with return electrode 604c, and therapeutic electrode E4 602d with return electrode 604d. Using this configuration, two separate two-channels-in-one channel pairs 606a, 606b may be established. As illustrated, the first therapeutic electrode E1 602a and the second therapeutic electrode E2 602b form a first two-channels-in-one channel pair 606a, while the third therapeutic electrode E3 602c and the fourth therapeutic electrode E4 602d form a second two-channels-in-one channel pair 606b. In a second example configuration, the first therapeutic electrode E1 602a may be paired with the third therapeutic electrode E3 602c in a first channel pair, while the second therapeutic electrode E2 602b is paired with the fourth therapeutic electrode E4 604d in a second channel pair. In a third configuration, for example, the first therapeutic electrode E1 602a may be paired with the fourth therapeutic electrode E4 602d in a first channel pair, while the second therapeutic electrode E2 602b is paired with the third therapeutic electrode E3 604c in a second channel pair.

Turning to FIG. 6B, in a second example electrode configuration similar to the configuration of FIG. 6A, the dedicated return electrodes 604a-d have been replaced with a single return electrode 612. The single return electrode 612 configuration provides the advantage of allowing for an even smaller device footprint. Additionally, costs may be reduced due to the streamlined circuitry. However, when using a single return electrode, there can be the potential for crosstalk. Thus, the controller element of the circuitry may include a more sophisticated design that manages the interleaving of pulses, with timed on and off states, that minimizes or avoids the potential for crosstalk.

In an alternative configuration, multiple electrodes could be used as return electrodes for a single stimulating electrode. Such is the case depicted in FIG. 6C, in which a 5-electrode array consisting of four stimulation electrodes and a single return electrode (left figure) is reduced, similar to what was shown in FIG. 6B, to a 4-electrode array; however, in FIG. 6C all electrodes but the one stimulating serve as return electrodes. When using multiple return electrodes, the current density in the vicinity of any particular return electrode will be smaller in comparison with a single return electrode configuration. The smaller current density, in turn, lowers the probability of activation of tissue around any particular return electrode, as the total charge at any given return electrode would be lower than what it would have been if a single return electrode had been used. Conversely, in embodiments where electrodes have the same conductive surface area and each stimulating electrode is paired with a single return electrode (e.g., FIG. 6A and FIG. 6B), due to the increased current density in the single return electrode, amplitude at the stimulation electrode may be limited in range in comparison to the multiple return electrode configuration of FIG. 6C. This is because increasing the amplitude may activate inadvertent triggering in the vicinity of the single return electrode.

As illustrated in FIG. 6B, similar to the configuration of FIG. 6A, the first therapeutic electrode E1 602a and the second therapeutic electrode E2 602b form a first two-channels-in-one channel pair 606a, while the third therapeutic electrode E3 602c and the fourth therapeutic electrode E4 602d form a second two-channels-in-one channel pair 606b. However, as described in relation to FIG. 6A and as illustrated in a configuration diagram 620 of FIG. 6C, each electrode 602 may be paired with any other one or more than one electrode 602.

Example Stimulation Parameters

In some embodiments, stimulation pulses are delivered in pulse patterns. Individual pulses in the pattern may vary in frequency and/or pulse-width. Patterns may be repeated in stimulation cycles. The pulse pattern, for example, may be designed in part to ramp up stimulation, establishing a comfort level in the wearer to the feel of the stimulation. In another example, the pulse pattern may be designed in part to alternate stimulation between stimulation sites where two or more sites are being stimulated during therapy. In examples involving multiple stimulation sites, the stimulation pattern may be designed such that stimulating frequencies are not the same in all sites at which stimulation is being delivered.

In some embodiments involving electrical stimulation utilizing either percutaneous or transcutaneous (i.e., non-penetrating) electrodes, the stimulation frequencies vary within a set of ranges. For example, the stimulation frequencies applied in a stimulation pattern may include a first or low frequency within a range of about 1 to 30 Hz, a second or mid-range frequency within a range of about 30 to 70 Hz, a third or high frequency within a range of about 70 to 150 Hz; and/or a fourth or very high frequency within a range of about 150 to 300 Hz.

TABLE 2

Electrical therapy: Frequency Table

| Frequency designation | Range in Hz |
|---|---|
| Low frequency | 1-30 |
| Mid-range frequency | 30-70 |
| High frequency | 70-150 |
| Very high frequency | 150-300 |

In one embodiment, a stimulation frequency is varied between 2 Hz and 100 Hz. In yet another embodiment, the pulse-width can be adjusted from between 20 and 1000 microseconds to further allow therapy customization. Stimulation frequency is an important differentiator between neural networks; for example, using a high frequency has been shown to be beneficial in activating the desired trigeminal system features; in contrast, a low frequency is preferred in activating the desired vagal features. Thus, in a preferred embodiment, a combination of low frequency and high frequency is applied respectively to activate vagal and trigeminal branches in accordance with various embodiments described herein. In yet another embodiment, a variable frequency (e.g., stimulating at a non-constant frequency) can be used at one or more of the electrodes. The variable frequency can be a sweep, and/or a random/pseudo-random frequency variability around a central frequency (e.g., 15 Hz+/−1.5 Hz, or 100 Hz+/−10 Hz). Varying the stimulation frequency in a random or pseudo-random way can help to prevent neural accommodation, and in some cases achieve qualitatively different results. In a particular case, it may produce the opposite effect of that produced using a single frequency. For example, in some cases the P/S ratio may be increased using a single frequency but decreased using the same frequency as the center frequency of a pseudo-random varying frequency around that center frequency.

When using electrical stimulation, different combinations of pulse-widths can be used at each electrode. Pulse-widths, in some examples, may range from one or more of the following: first or short pulse-widths within a range of about 10 to 50 microseconds, or more particularly between 10 to 20 microseconds, 20 to 30 microseconds, 30 to 40 microseconds, 40 to 50 microseconds; second or low mid-range pulse-widths within a range of about 50 to 250 microseconds, or more particularly between 50 to 70 microseconds, 70 to 90 microseconds, 90 to 110 microseconds, 110 to 130 microseconds, 130 to 150 microseconds, 150 to 170 microseconds, 170 to 190 microseconds, 190 to 210 microseconds, 210 to 230 microseconds, or 230 to 250 microseconds; third or high mid-range pulse-widths within a range of about 250 to 550 microseconds, or more particularly between 250 to 270 microseconds, 270 to 290 microseconds, 290 to 310 microseconds, 310 to 330 microseconds, 330 to 350 microseconds, 350 to 370 microseconds, 370 to 390 microseconds, 390 to 410 microseconds, 410 to 430 microseconds, 430 to 450 microseconds, 450 to 470 microseconds, 470 to 490 microseconds, 490 to 510 microseconds, 510 to 530 microseconds, or 530 to 550 microseconds; fourth or long pulse-widths within a range of about 550 to 1000 microseconds, or more particularly between 550 to 600 microseconds, 600 to 650 microseconds, 650 to 700 microseconds, 700 to 750 microseconds, 750 to 800 microseconds, 800 to 850 microseconds, 850 to 900 microseconds, 900 to 950 microseconds, or 950 to 1000 microseconds; and/or a fifth or very long pulse-widths within a range of about 1000 to 4000 microseconds or more particularly between 1000 to 1250 microseconds, 1250 to 1500 microseconds, 1500 to 1750 microseconds, 1750 to 2000 microseconds, 2000 to 2250 microseconds, 2250 to 2500 microseconds, 2500 to 2750 microseconds, 2750 to 3000 microseconds, 3000 to 3250 microseconds, 3250 to 3500 microseconds, 3500 to 3750 microseconds, 3750 to 4000 microseconds. Different embodiments can use different ranges of pulse-widths at one or more of the electrodes. The selection of the stimulation pulse-width depends on the desired target fiber as well as the output intensity. For example, given a similar intensity, activation of C type fibers generally requires a longer pulse-width than activation of a myelinated Aβ fiber. In a preferred embodiment, the use of a low mid-range pulse is used in order to preferably activate myelinated fibers.

TABLE 3

Electrical Therapy: Pulse-Width Table

| Pulse-width designation | Range in microseconds |
|---|---|
| Very short pulse | 10-50 |
| Short pulse | 50-150 |
| Low mid-range pulse | 151-350 |
| High mid-range pulse | 351-550 |
| Long pulse | 551-1000 |
| Very long pulse | 1001-4000 |

Activity on the VEF can be modulated by electrical stimulation at various sites. For example, the vagus nerve ascends inside the carotid sheath along the neck (e.g., cervical vagus) where it can be non-invasively stimulated in a transcutaneous way, for example using patch electrodes or a device such as the one described by U.S. Pat. No. 10,207,106 to Simon et al.

Activity on the VEF can also be modulated by stimulating the auricular branch of the vagus nerve (ABVN) and/or by stimulating a branch of the trigeminal nerve. Each of these pathways activate neurons in the Nucleus of the Solitary Track (NTS) which directly and indirectly increases VEF activity. Trigeminal nerves approach the subcutaneous region at several locations in the face; for example, the auriculotemporal nerve (ATN), the Supraorbital nerve, Supratrochlear nerve, Infratrochlear nerve, Palpebral branch of lacrimal nerve, External nasal nerve, Infraorbital nerve, Zygomaticofacial nerve, Zygomaticotemporal nerve, Mental nerve, and Buccal nerve are potential trigeminal targets to deliver transcutaneous stimulation. A device placing electrodes such that any of these branches is stimulated can be used activate the VEF. For example, a device such as the one described by U.S. Pat. No. 10,207,106 to Simon et al. could be utilized to stimulate a branch of the vagus nerve. In a similar manner, the device described by U.S. Pat. No. 8,914,123 to Rigaux can be used to stimulate a branch of the trigeminal nerve. Further, although cumbersome, both devices could be used simultaneously or in an alternating manner to elicit a vagal, a trigeminal, or a trigemino-vagal response. The ABVN can be stimulated at the auricle, the preferential targets for this purpose being the cymba concha, the concha, the tragus and/or inside the ear canal, as well as behind the ear in or around the mastoid canaliculus (McS, a.k.a. Arnold's canal). The ATN can be stimulated in or around the auricle; for example immediately rostral to the auricle on top of and/or above the temporomandibular joint (TMJ). The ABVN as well as the trigeminal nerve branches can be activated individually, simultaneously, or sequentially, such as in an interleaved manner. Further, these nerves can be stimulated non-invasively using transcutaneous electrodes (e.g., as described by U.S. Pat. No. 11,351,370 to Covalin et al., incorporated herein by reference in its entirety).

Example Devices and Stimulation Paths

Turning to FIG. 8C, a WANS apparatus 830 includes a forward portion 832 including a conductive adhesive region 834 with a surrounding non-conductive adhesive region 844b and a rear portion 836 including conductive adhesive regions 838 and 840 with a surrounding non-conductive adhesive region 844a. The non-conductive adhesive regions 844a, 844b, for example, may provide extra adhesion for a robust skin/conductive adhesive contact. The conductive adhesive region 834 of the forward portion 832, for example, corresponds to a second electrode (II) 842b. Turning to the rear portion 836, the conductive adhesive region 838 corresponds to a first electrode (I) 842a, and the conductive adhesive region 840 corresponds to a third electrode (III) 842c. In some embodiments, the electrodes 842a-c and their corresponding conductive adhesive regions 834, 838, and 840 each have a similar shape and area. In other embodiments, the shape and/or surface area of each of the electrodes 842a-c and/or their corresponding conductive adhesive regions 834, 838, and 840 may differ, for example based on the underlying target nerve structures and/or the shape of the anatomy on which the electrodes 842a-c and their corresponding conductive adhesive regions 834, 838, and 840 are configured to be positioned.

The conductive adhesive region 834, in some implementations, is configured to contact skin of a wearer in a region of nerve structures of the auriculotemporal nerve (ATN) and/or nerve structures connected to the ATN, such that delivery of therapeutic stimulation via the conductive adhesive region 834 modulates ATN activity. In an illustrative example, an electrode in electrical communication with the conductive adhesive region 834 may be positioned in proximity to the temporomandibular joint.

In some embodiments, the conductive adhesive region 838 is configured to contact skin of a wearer in a region of nerve structures of the auricular branch of the vagus nerve (ABVN) and/or nerve structure connected to the ABVN such that delivery of therapeutic stimulations via the conductive adhesive region 838 modulates ABVN activity. In an illustrative example, an electrode in electrical communication with the conductive adhesive region 838 may be positioned in proximity to the mastoid canaliculus (MsC).

The conductive adhesive region 840, in some embodiments, is configured to contact skin of the patient as a return electrode, thereby forming an electrical circuit across the tissue with the electrodes corresponding to each of the forward conductive adhesive region 834 and the rear conductive adhesive region 836. Although illustrated as a single return electrode (e.g., third electrode 842c) provided for both electrodes 842a and 842b corresponding to adhesive region 838 and adhesive region 834, in other embodiments, a different, separate return electrode may be provided for each electrode 842a, 842b. In further embodiments, three or more return electrode paths may be provided for the two positive electrodes. Other combinations are possible.

Figure 8E:
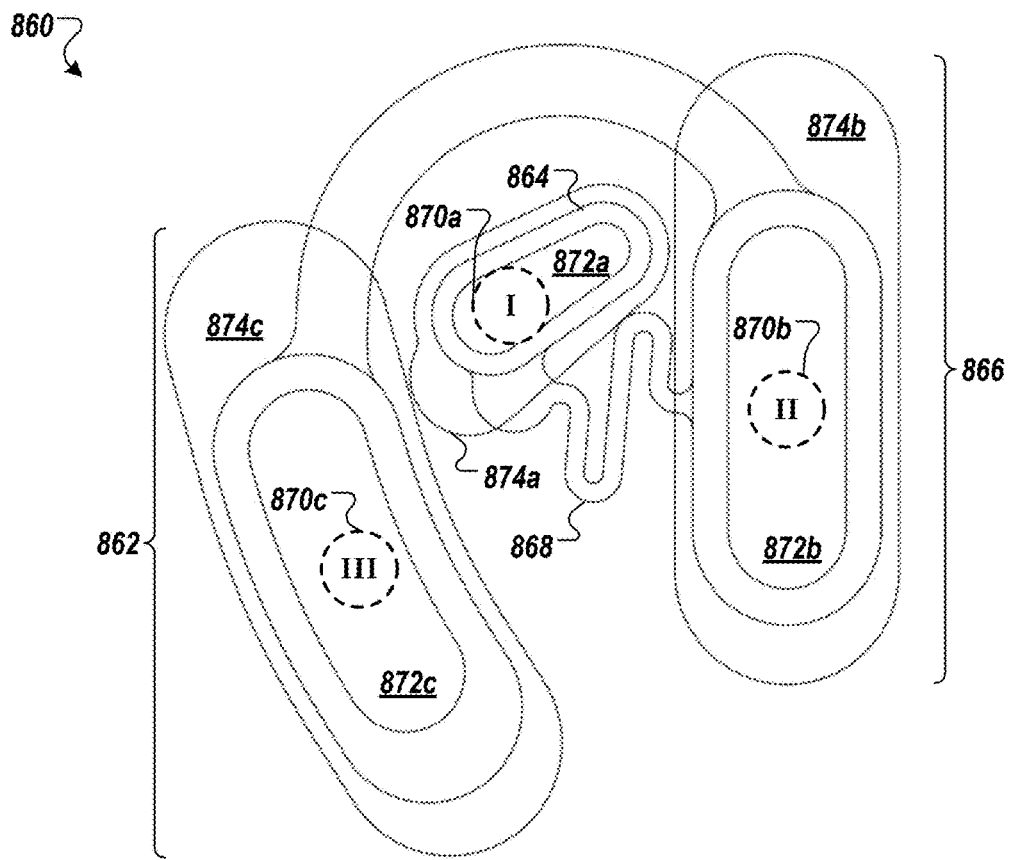
FIG. 8E and FIG. 8F are diagrams representing of an electrode configuration and an equivalent circuit for providing therapy according to a third example.

Turning to FIG. 8E, a wearable auricular neurostimulator (WANS) 860 includes a forward portion 866, a rear portion 862, and an on-ear portion 864, each portion including at least one electrode (e.g., electrodes 870a, 870b, and 870c). When donned by a wearer, the WANS 860 may be wrapped around the ear such that forward portion 866 is disposed in front of the ear and the rear portion 862 is disposed behind the ear. The on-ear portion 864, connected to the forward portion 866 by a flexible connector 868, may be frictionally and/or adhesively retained in a cymba region of the ear.

To increase engagement of the WANS 860 with tissue of the wearer and/or to enhance electrical communication between the tissue and the electrodes 870a-c, in some embodiments, each electrode 870a-c is disposed in electrical communication with a corresponding conductive adhesive region 872a-c. The conductive adhesive regions 872a-c may create an electrical communication path from an electrode positioned in or on the WANS 860 to skin of the wearer. To protect and maintain cleanliness of the conductive adhesive regions 872a-c prior to wearing, in some implementations, the WANS 860 is provided with one or more liners, such as the liners 874*a-c*. To provide robust skin contact, in some implementations, the conductive adhesive regions 872*a-c* are surrounded by one or more non-conductive adhesive regions. In some embodiments, the electrodes 870*a-c* and their corresponding conductive adhesive regions 872*a-c* have a similar shape and area. In other embodiments, the size and/or shape varies electrode-to-electrode and/or adhesive region-to-adhesive region, for example based on the targeted underlying nerve structures and/or the topography of the anatomy on which the particular electrode and adhesive region are configured to be positioned.

The conductive adhesive region 872*a* may be provided to create an electrical communication path from the electrode 870*a* positioned on the on-ear portion 864 of the WANS 860 to skin of the wearer in an anterior part of the ear canal. Turning to FIG. 12, such an electrode, for example, may be positioned to stimulate the nervus meatus acustici externi branch 1200 of the ATN 1002. In other embodiments, in order to stimulate branches of the ABVN, the conductive adhesive region 872*a* is positioned on the concha, on the cymba concha, or on the tragus.

Turning to FIG. 8E, a wearable auricular neurostimulator (WANS) 860 includes a forward portion 866, a rear portion 862, and an on-ear portion 864, each portion including at least one electrode (e.g., electrodes 870*a*, 870*b*, and 870*c*). When donned by a wearer, the WANS 860 may be wrapped around the ear such that forward portion 866 is disposed in front of the ear and the rear portion 862 is disposed behind the ear. The on-ear portion 864, connected to the forward portion 866 by a flexible connector 868, may be frictionally and/or adhesively retained in a cymba region of the ear.

To increase engagement of the WANS 860 with tissue of the wearer and/or to enhance electrical communication between the tissue and the electrodes 870*a-c*, in some embodiments, each electrode 870*a-c* is disposed in electrical communication with a corresponding conductive adhesive region 872*a-c*. The conductive adhesive regions 872*a-c* may create an electrical communication path from an electrode positioned in or on the WANS 860 to skin of the wearer. To protect and maintain cleanliness of the conductive adhesive regions 872*a-c* prior to wearing, in some implementations, the WANS 860 is provided with one or more liners, such as the liners 874*a-c*. To provide robust skin contact, in some implementations, the conductive adhesive regions 872*a-c* are surrounded by one or more non-conductive adhesive regions. In some embodiments, the electrodes 870*a-c* and their corresponding conductive adhesive regions 872*a-c* have a similar shape and area. In other embodiments, the size and/or shape varies electrode-to-electrode and/or adhesive region-to-adhesive region, for example based on the targeted underlying nerve structures and/or the topography of the anatomy on which the particular electrode and adhesive region are configured to be positioned.

The conductive adhesive region 872*a* may be provided to create an electrical communication path from the electrode 870*a* positioned on the on-ear portion 864 of the WANS 860 to skin of the wearer in an anterior part of the ear canal. Turning to FIG. 12, such an electrode, for example, may be positioned to stimulate the nervus meatus acustici externi branch 1200 of the ATN 1002. In other embodiments, in order to stimulate branches of the ABVN, the conductive adhesive region 872*a* is positioned on the concha, on the cymba concha, or on the tragus.

Turning to FIG. 8A and FIG. 8B, in a preferred embodiment, stimulation may be provided transcutaneously using an auricular stimulation device 800. The auricular stimulation device 800 is shown having electrodes 802, 804, 806, and 808. The electrodes 802, 804, 806, and 808, for example, may be configured to form corresponding circuits 810*a* and 810*b* according to an example. In an example, equivalent circuit 810*a* may be formed by electrode 802 and electrode 806 which are configured to stimulate tissue portion 820. In this example, tissue portion 820 is positioned to target the cymba conchae region which is enervated by branches of the auricular branch of the vagus nerve and the region behind the ear which is enervated by branches of the great auricular nerve and branches of the lesser occipital nerve. In an example, equivalent circuit 810*b* may be formed by electrode 804 and electrode 808 which are configured to stimulate tissue portion 822. In this example, tissue portion 822 may be positioned to target the region rostral to the ear under which the Auriculotemporal nerve transmits and gives out branches, as well as the region behind the ear which is enervated by branches of the great auricular nerve and branches of the lesser occipital nerve.

In an example, the tissue portion 820 can be the concha, the cymba concha, or a portion of both, which allows for ABVN stimulation and is stimulated at approximately 5 Hz or at 15 Hz, or at 30 Hz. In an example, the tissue portion 820 can be disposed in a region of the trigeminal nerve which is stimulated at approximately 80 Hz, or at 100 Hz or at 120 Hz or at 150 Hz.

In an example, equivalent circuit 810*a* is stimulated by a first channel and equivalent circuit 810*b* is stimulated by a second channel.

Turning to FIG. 8C and FIG. 8D, in some embodiments, stimulation may be provided transcutaneously using the electrodes 842*a*, 842*b*, and 842*c* of the auricular stimulation device 830. The electrodes 842*a*, 842*b*, and 842*c*, for example, may be configured to form corresponding circuits 850*a* and 850*b*.

In a first example, equivalent circuit 850*a* may be formed by electrode 842*b* and electrode 842*c* which are configured to stimulate tissue portion 852*a*. In this example, tissue portion 852*a* may be positioned to target the ATN in or around the area rostral to the auricle in proximity to the TMJ. For example, the equivalent circuit 850*a* may be designed to deliver stimulations to modulate activity in the VEF.

In a second example, equivalent circuit 850*b* may be formed by electrode 842*a* and electrode 842*c* which are configured to stimulate tissue portion 852*b*. In this example, tissue portion 852*b* may be positioned to modulate activity in the VEF by stimulating the AVBN in or around the McS.

In yet another example, to achieve a synergetic outcome, both the AVBN and the ATN are stimulated respectively in or around the McS and in or around the area rostral to the auricle in proximity to the TMJ. In this scenario, for example, both the AVBN and the ATN may be stimulated approximately at the same time in an interleaved manner. In illustration, each of electrodes 842*a* and 842*b* may be multiplexed with electrode 842*c* to form a circuit and forced current on to tissue 852*a* and tissue 852*b* in an alternating fashion. In another example, the AVBN and the ATN may be stimulated simultaneously.

In some embodiments, equivalent circuit 850*a* is stimulated by a first channel and equivalent circuit 850*b* is stimulated by a second channel.

Figure 8F:
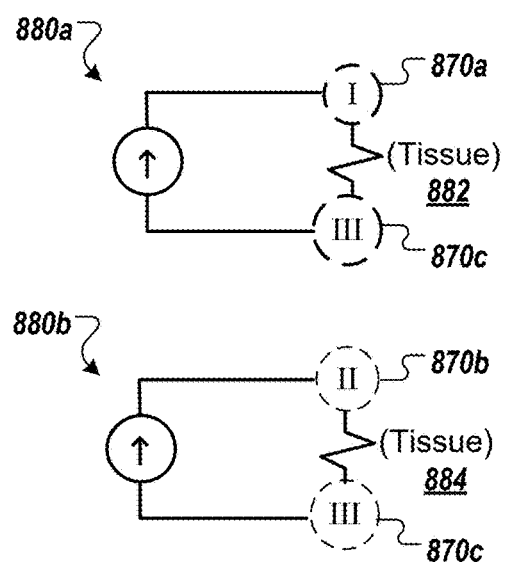

Turning to FIG. 8E and FIG. 8F, the auricular stimulation device 860 is shown having electrodes 870*a*, 870*b*, and 870*c*. The electrodes 870*a*, 870*b*, and 870*c*, for example, may be configured to form corresponding circuits 880*a* and 880*b* according to an example. In an example, equivalent circuit 880*a* may be formed by electrode 870*a* and electrode 870*c* which are configured to stimulate tissue portion 882. In this example, tissue portion 882 may be positioned to target the cymba conchae region which is enervated by branches of the auricular branch of the vagus nerve (e.g., positioned for stimulation by the first electrode 870a) and the region behind the ear (e.g., positioned for stimulation by the third electrode 870c) which is enervated by branches of the great auricular nerve and branches of the lesser occipital nerve. In a second example, equivalent circuit 880b may be formed by electrode 870b and electrode 870c which are configured to stimulate tissue portion 884. In this example, tissue portion 884 may be positioned to target the region rostral to the ear (e.g., positioned for stimulation by the second electrode 870b) which is enervated by the auriculotemporal nerve as well as the region behind the ear (e.g., positioned for stimulation by the third electrode 870c) which is enervated by branches of the great auricular nerve and branches of the lesser occipital nerve.

In some embodiments, the tissue portion 882 is a tissue region of the concha, the cymba concha, or a portion of both, which is stimulated at approximately 5 Hz or at 15 Hz, or at 30 Hz. In some embodiments, the tissue portion 884 is disposed in a region of the trigeminal nerve which is stimulated at approximately 80 Hz, or at 100 Hz or at 120 Hz or at 150 Hz.

In some embodiments, equivalent circuit 882 is stimulated by a first channel and equivalent circuit 884 is stimulated by a second channel. The first and second channels may be activated simultaneously and/or in an interleaved manner.

Example Hardware Systems

Figure 7:
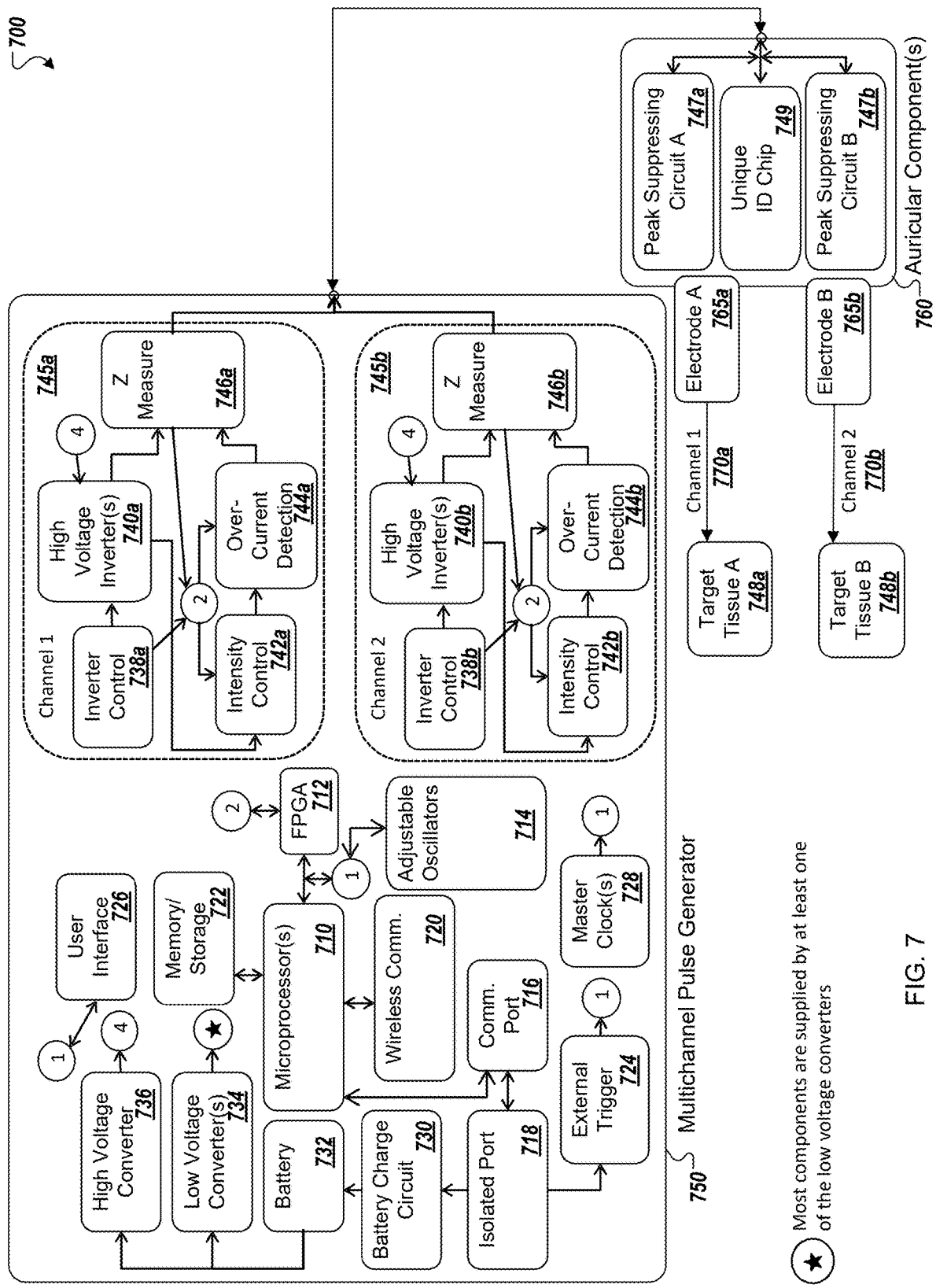
FIG. 7 is a block diagram of components of an example pulse generator in communication with an example auricular therapy device.

Turning to FIG. 7, a block diagram 700 of example components of a pulse generator 750 in communication with example components of an auricular component 760 is shown. The multichannel pulse generator circuit 750, in some embodiments, has at least one microcontroller or a microprocessor 710 with at least one core. When multiple microcontrollers or multiple cores are present, for example, one core may control the wireless communication 720 and other core(s) may be dedicated to control the therapy. In some implementations, a low power programmable logic circuitry (e.g., field programmable gate array (FPGA) or programmable logic device (PLD)) 712 is also provided. For example, the microcontroller 710 may be configured to switch into a low power mode as frequently as possible while the programmable logic circuitry 712 controls therapy delivery.

In some embodiments, an inverter circuit 745a, 745b is used to generate biphasic/bipolar pulses. In some embodiments, one inverter circuit 745a, 745b is used per channel 770a, 770b, while in other embodiments, a single inverter circuit 745 is used for both channels 770a, 770b. Each channel 770a, 770b, for example, may target a different anatomical area (e.g., tissue region) 748a, 748b. A high voltage compliance (e.g., >50V, in other embodiments >70V, and yet in others >90V) may be used to ensure there is enough margin on the electrical potential to generate current demanded by the intensity control 742a, 742b of each inverter circuit 745a,745b by providing one or more high voltage inverters 740a, 740b per inverter circuit 745a, 745b. In order to enhance safety, in some embodiments, an over current detection circuit 744a, 744b is provided in each inverter circuit 745a, 745b. In some embodiments, an impedance measuring circuit 746a, 746b is provided in each inverter circuit 745a, 745b. The impedance measuring circuit 746a, 746b, for example, may support tracking impedance over time to identify failure of sufficient therapy delivery. In some examples, therapy delivery may be compromised when the electrodes are not in contact or in good contact with the target tissue 748a, 748b when a cable or connector between the multichannel pulse generator 750 is disconnected from one of the auricular component(s) 760, or where the electrodes have deteriorated or are defective. Monitoring impedance over time provides the added advantage that the condition of the contact electrode can be followed; thus allowing the controller to alert the user when the contact electrodes are close to their end of life or no longer viable. The FPGA 712 may control the inverter circuits 745a, 745b and receive feedback from an inverter control component 738a, 738b.

As illustrated, using the two-channels-in-one advancements described above, the pulse generator 750 may include independent control for just two channels. In other embodiments, one or more additional sets of inverter circuits 745, each feeding to an additional electrode 765, may be included in the multichannel pulse generator 750.

In some implementations, a battery 732 is used to power the pulse generator 750. The battery 732, for example, may power components of the pulse generator 750 and/or the auricular component(s) 760 via a one or more low voltage converters 734. Further, the pulse generator 750 may include a high voltage converter 736, coupled to one or more high voltage inverters 740a, 740b, for delivery electrical stimulation therapy via the one or more channels 745a, 745b.

In some embodiments, an isolated port 718, such as a universal serial bus (USB) is used to charge the battery 732. In other embodiments, charging of the battery is accomplished wirelessly using induction coupling (not shown). The battery 732 may be charged via battery charge circuit 730.

In some implementations, the isolated port 718 is used to communicate with the microcontroller(s) 710 (e.g., via a communications port 716). The communication can be both ways, such that instructions or entire new code can be uploaded to the microcontroller(s) 710 and information stored in a memory 722 may be downloaded. In some embodiments, the memory 722 or additional memory can be added to the circuitry as an external component (e.g., in wireless or wired communication with the pulse generator 750). For example, the isolated port 718 (e.g., USB) may be used to connect memory to the pulse generator 750. In other embodiments, at least portions of the memory 722 may be internal to the microcontroller(s) 710. In some embodiments, the FPGA 712 may also have internal memory.

In some embodiments, an external trigger circuit 724 is included, such that the stimulation can be started and/or stopped via an external signal. In some embodiments, the external trigger signal can be passed through the isolated port 718; in yet other embodiments a modified USB configuration (i.e., not using the standard USB pin configuration) can be used to pass the trigger signal. Using a modified USB configuration will force a custom USB cable to be used, thus ensuring that an external trigger cannot be provided by mistake using an off-the-shelf USB cable. In a further example, the external trigger signal may be wirelessly transmitted (e.g., by Bluetooth) from a separate source.

In some embodiments, a hardware user interface is provided for interacting with the multichannel pulse generator 750 via user interface circuitry 726. In an example, the user interface circuitry 726 can include of buttons, LEDs, haptic (e.g., piezoelectric) devices such as buzzers, and/or a display, or a combination of any of them. In some embodiments, the user interface circuitry 726 includes signal processing components for interpreting user interface commands delivered via an external device (e.g., through the wireless communications 720). The external device, in some examples, may be a smart phone app, a tablet computer, or a medical monitoring device (e.g., in a hospital setting).

In some embodiments, an external master clock 728 is used to drive the microcontroller(s) 710 and/or the FPGA 712. In other embodiments the clock(s) of the components can be internal or integrated or co-packaged with the microcontroller(s) 710 and/or the FPGA 712. In some embodiments, one or more oscillators, including in some cases adjustable oscillators 714 are used to set pulse parameters such as, for example, frequency and/or pulse-width. The oscillators 714, for example, may be controlled to set pulse parameters for producing modulated waveforms as described in relation to FIG. 3A through FIG. 3E.

In some embodiments, the auricular component 760 is made from a thin flex PCB or printed electronics, such that it is light weight and can be easily bent to accommodate different anatomies. In some embodiments, the auricular component 760 has more than one channel. The auricular component 760, or each channel thereof, may include a peak suppressing circuit 747*a*, 747*b* and electrodes 765*a*, 765*b* to contact the skin at the location of the target tissue 748*a*, 748*b*. In some embodiments, the auricular component(s) 760 includes a unique chip identifier or unique ID chip 749. The unique ID chip can be used to track usage as well as to prevent other non-authorized circuits from connecting to the multichannel pulse generator 750. At least one auricular component(s) 760 is connected to the multichannel pulse generator 750.

In some embodiments, the auricular component 760 is made from a thin flex PCB or printed electronics, such that it is light weight and can be easily bent to accommodate different anatomies. In some embodiments, the auricular component 760 has more than one channel. The auricular component 760, or each channel thereof, may include a peak suppressing circuit 747*a*, 747*b* and electrodes 765*a*, 745*b* to contact the skin at the location of the target tissue 748*a*, 748*b*. In some embodiments, the auricular component(s) 760 includes a unique chip identifier or unique ID chip 749. The unique ID chip can be used to track usage as well as to prevent other non-authorized circuits from connecting to the multichannel pulse generator 750. At least one auricular component(s) 760 is connected to the multichannel pulse generator 750.

Figure 9:
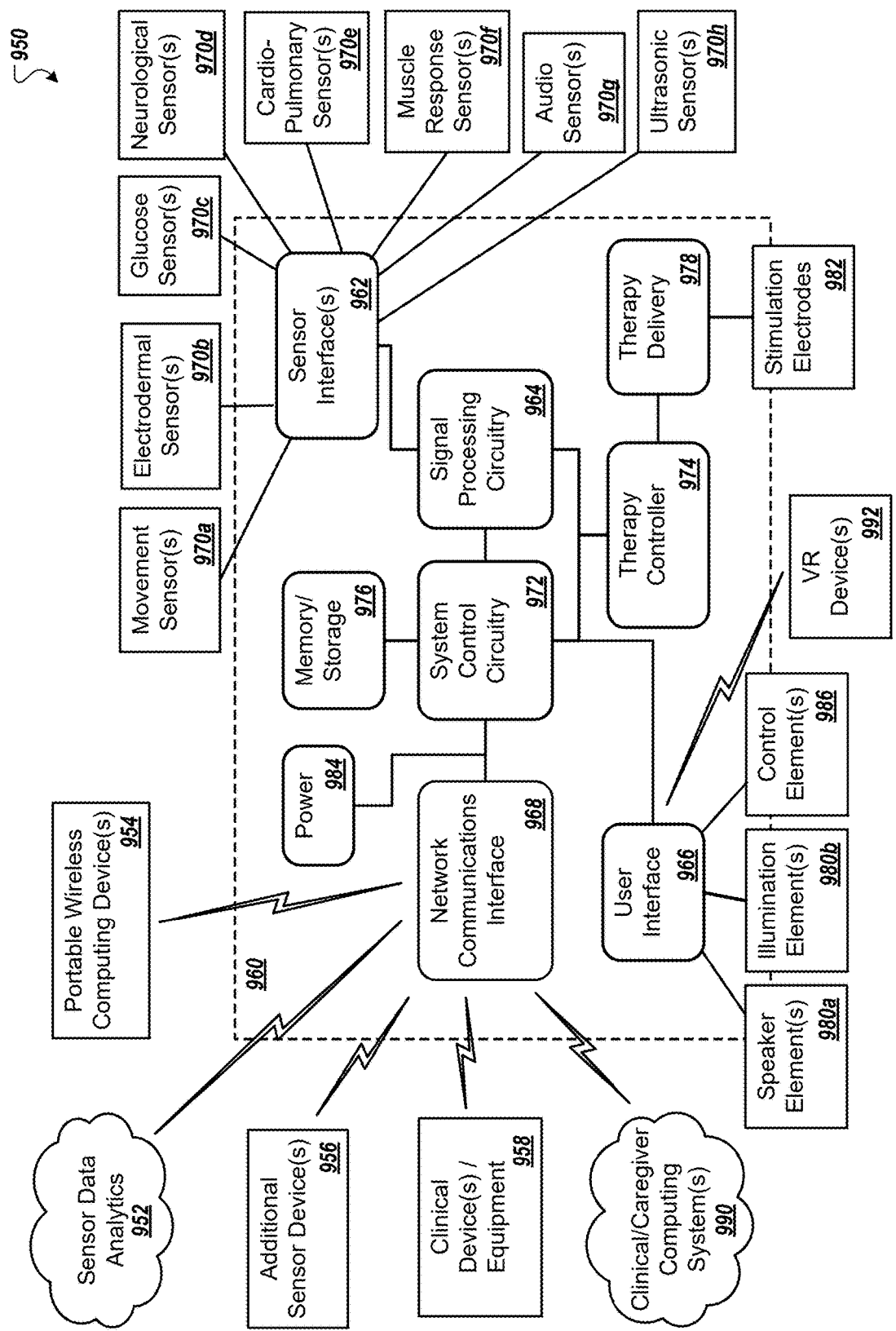
FIG. 9 illustrates an example system including a treatment device, sensor(s), and sensor signal conditioning and/or analysis circuitry.

In some embodiments, methods and systems of the present disclosure use feedback to monitor and/or modify the therapy. Turning to FIG. 9, an environment 950 and system 960 for using feedback in neurostimulation is illustrated. The environment 950 and/or the system 960 may incorporate elements of various treatment devices described herein. Further, the environment 950 may include peripheral devices 954, 958, 956, 990 and/or a network system 932. Additionally, the system 960 may include aspects of a multichannel pulse generator, described in detail below. The environment 950 and system 960, for example, may be used to analyze sensor data in real-time, allowing for closed loop neurostimulation based on feedback data related to the wearer of a neurostimulation device. In another example, feedback monitoring can be used to alert the patient, a caregiver, and/or a clinical resource regarding therapy progress and/or a problem with the therapy. For example, a caregiver or clinician may be contacted, at clinical/caregiver computing system(s) 990, in the event that therapy is not being adequately delivered and/or if the treatment device has been removed.

In some implementations, the system 960 is activated at least in part by initiating delivery of power via power control circuitry 984 to the system 960. One or more control elements 986, for example, may provide the ability for a wearer or patient to activate the system 960 and/or to set initial therapeutic parameters. In certain embodiments, therapy may be remotely activated and/or adjusted through an external device, such as a portable computing device 954.

In some implementations, one or more sensor interfaces 962 of the system 960 obtain feedback from one or more sensors 970. Various sensors 970, for example, may be provided for monitoring one or more symptoms being treated by the therapy, such as, in some examples, symptoms of stress and/or anxiety, pain, nausea, fatigue, inflammation, and/or disorientation/dizziness. In another example, certain sensors 970 may be provided to monitor for activities or actions of the wearer to coordinate therapeutic stimulation with the activity/action. In some examples, the sensors 970 may include one or more movement sensors 970*a* (e.g., motion sensors, accelerometers, and/or gyroscopes) for monitoring movement activity (e.g., tremors, physiologic movement), one or more electrodermal sensors 970*b* including, in some cases, electrochemical sensors for monitoring electrodermal activity (e.g., sweating, cortisol, etc.), one or more glucose sensors 970*c* for monitoring glucose level, one or more neurological sensors 970*d* for monitoring neurological activity (e.g., via electroencephalogram (EEG) sensing electrodes), one or more cardio-pulmonary sensors 970*e* for monitoring cardio-pulmonary activity (e.g., electrocardiogram (EKG) sensing electrodes, heart rate sensor(s), blood pressure (systolic, diastolic and mean) sensor(s), etc.), and/or muscle response sensor(s) 970*f* for monitoring muscle response activity (e.g., electromyography (EMG) sensors). The sensors 970, in another example, may include one or more audio sensors 970*g* (e.g., microphones, bone conduction microphones, vibrational sensors, etc.) for obtaining sound signals (e.g., verbalizations and/or utterances, breathing sounds, heart sounds, etc.). In an additional example, the sensors 970 may include one or more ultrasonic sensors 970*h* for measuring deep tissue signals such as, in some examples, central blood pressure, cerebral blood flow velocity (CBFV), heart rate, and/or cardiac output.

The sensors 970 may be in wired and/or wireless communication with the sensor interface(s) 962 of the system 960. Certain sensors 970, for example, may be integrated into the earpiece and/or concha apparatus of an ear-mounted neurostimulation devices such as various devices described in the present disclosure. One or more sensors 970, in another example, may be integrated into a pulse generator for neurostimulation therapy delivery. Further to the example, periodic monitoring may be achieved through prompting the wearer to touch one or more electrodes on the system 960 (e.g., electrodes built into a surface of the pulse generator) or otherwise interact with a component of the system 960 such as the pulse generator (e.g., hold the pulse generator extended away from the body to monitor tremors using a motion detector in the pulse generator). The prompting, for example, may be supplied via a user interface 966 by one or more speaker elements 980*a* (e.g., a verbal command) and/or one or more illumination element(s) 980*b* (e.g., an LCD display, LED display, 7-segment digital display, and/or LED indicator(s) next to printed information on a surface of the system 960).

In some implementations, the user interface 966 is used to deliver a portion of the therapy to the wearer. For example, the system 960 may coordinate neurostimulation therapy with a Virtual Reality (VR) device 992. The VR device 992, in some examples, may deliver audio, visual, and/or haptic output coinciding with the goals of a particular therapy. In example, to reduce stress and anxiety, the system may configure the VR device 992 to provide relaxing audio and/or visual output to the wearer during neurostimulation therapy. In another example, to overcome PTSD, phobias, cravings, and/or other addiction-related triggers, the VR device 992 may be configured to present triggering audio and/or visual content during neurostimulation therapy. Although illustrated as being a separate VR device 992, in other embodiments, neurostimulation electrodes are built into the VR device (e.g., a VR headset) as a virtual reality-enabled neurostimulation therapy device.

In some implementations, feedback data gathered by the system 960, such as sensor feedback, may be supplied by a pulse generator to one or more of the peripheral devices 954, 990. The feedback, for example, may include sensor signals related to symptoms of the patient being treated by the system 960. A clinical user monitoring sensor metrics related to these signals may manually adjust the delivery of therapy accordingly using the one or more adjustable controls provided by the application. Further, in some implementations, the feedback may be used by one of the peripheral devices 954, 990 to generate a notification for review by the patient, a caregiver, or a clinician. The notification, for example, may include a low power notification, a device removed notification, or a malfunction notification. In an illustrative example, the system 960 may monitor impedance measurements allowing closed loop neurostimulation. The notifications regarding removal or malfunction, for example, may be issued upon determining that the impedance measurements are indicative of lack of a proper contact between one or more electrodes of the treatment device and tissue on or surrounding the patient's ear. The notifications, for example, may be delivered to the patient and/or one or more third parties via an application executing on one of the peripheral devices 954, 990. For example, the application may issue an audible alarm, present a visual notification, or generate a haptic output on the peripheral device 954, 990. Further, in some embodiments, the application may issue a notification via a communication means, such as sending an email, text message, or other electronic message to one or more authorized users, such as a patient, caregiver, and/or clinician.

Conversely, in some implementations, a cloud platform having sensor data analytics 952 accessible via the network may receive the feedback, review present metrics, and relay instructions to the pulse generator (e.g., via a Wi-Fi network or indirectly via a local portable device 1354). The pulse generator, in a further example, may gather feedback from one or more fitness monitor and/or health monitor devices 954, 990, analyze the feedback, and determine whether to adjust treatment accordingly.

In other implementations, the pulse generator is included in the auricular component of a treatment device; that is, the pulse generator and auricular component may be co-located such that the need for an extension cable to connect them is not necessary. The auricular component and pulse generator may be wirelessly connected to an electronic device (for example a personal computer, a tablet or a phone) 954, 990 and/or to a remote server 952. In turn, in some embodiments, the electronic device 954, 990 is also wirelessly connected to the remote server 952.

In some implementations, the system 960 includes at least one isolated port for wired communication with the peripheral device(s) 954, 990. The isolated port, in some examples, may be a universal serial bus (USB) connection (e.g., a mini-USB connection, a micro-USB connection, a USB-C port, etc.), an Ethernet port, or a Serial ATA (SATA) connector. The isolated port, for example, may be included in the pulse generator for updating a software version running on the pulse generator or for reprogramming treatment settings of the pulse generator. The isolated port(s) may be connected to the network communications interface 968 for enabling communications between a peripheral device 954, 990 and the system 960 via the isolated port. The network communications interface 968 may couple the isolated port to the system control circuitry 972. For example, the network communications interface 968 may establish a direct (e.g., wired) communication link with one of the peripheral device(s) 954, 990 to transfer data from a memory 976 to the peripheral device 954, 990.

Further, a wireless radio frequency (RF) antenna (e.g., transmitter or transmitter/receiver), in some implementations, is included in the network communications interface 968. The RF antenna can be in wireless communication with the peripheral device(s) 954, 958 directly or via the network. The RF antenna, in combination with processing circuitry for generating wireless communications may function as a broadcast antenna, providing information to any RF receiver in a receiving region of the system 960. For example, the RF antenna may broadcast sensor data, sensor metrics, alerts, alarms, or other operating information for receipt by one or more peripheral devices 954, 990. In other implementations, the RF antenna, in combination with additional processing circuitry, may establish a wireless communication link with a particular peripheral device 954, 990. The wireless communication link, in some embodiments, is a secure wireless communication link (e.g., HIPAA-compliant) for sharing patient data with the peripheral device(s) 954, 990. The wireless communication link may be used to receive control settings from a peripheral device 954, 990 for controlling the functionality of the pulse generator, for example.

In some implementations, sensor data is received via a network communications interface 968 from the one or more portable wireless computing devices 954. In some examples, sensor elements of a common smart phone, smart glasses, smart rings, and/or smart watch (e.g., accelerometer, gyroscope, microphone, image sensor (e.g., cameras), heart rate monitor, oxygen saturation, blood pressure, glucose sensor, etc.) may be used by an application designed to interoperate with the system 960 to supply sensor data to the system 960. In illustration, imaging (e.g., video) of pupillary changes (e.g., pupillary dilation) may be captured by a smart phone or smart glasses and used by the system 960 as feedback for making therapy adjustments. The pupillometry measurements, for example, can be used as a measure of attention, alertness, or wakefulness (or the lack thereof). Thus, the feedback may be used to adjust therapy to maintain a desired level of attention, alertness, and/or wakefulness.

In some implementations, sensor data is received via the network communications interface 968 from one or more additional sensor devices 956. The additional sensor devices 956, in some examples, can include fitness monitors and/or activity trackers (e.g., for providing data similar to that collected by the movement sensor(s) 970*a*, the electrodermal sensor(s) 970*b*, and/or the cardio-pulmonary sensor(s) 970*e*), home health monitoring devices (e.g., digital smart blood pressure cuffs for providing data similar to that collected by the cardio-pulmonary sensor(s) 970*e*, digital smart thermometers, etc.), and/or remote patient monitoring devices (e.g., glucometer for providing data similar to that collected by the glucose sensor(s) 970*c*, pulse oximeter, wearable heart monitors such as a Holter monitor for providing data similar to that collected by the cardio-pulmonary sensor(s) 970e, etc.).

Sensor data, in some implementations, is received via the network communications interface 968 from one or more clinical devices and/or equipment 958. In illustration, imaging techniques such as magnetic resonance imaging (MRI) and/or functional MRI (fMRI) could be used to adjust the therapy in a clinical setting for a given user. In other examples, data similar to that collected by the neurological sensor(s) 970d, cardio-pulmonary sensor(s) 970e, glucose sensor(s) 970c, and/or muscle response sensor(s) 970f may be provided by various clinical equipment 958.

In some embodiments, the type of monitoring used by the system 960 and/or reliance on (e.g., trust in) various incoming sensor data may be based, in part, on a treatment setting. For example, neurological data captured by sensors such as the neurological sensor(s) 970d may be easier to capture in a hospital setting, while certain cardio-pulmonary data captured by sensors such as the cardio-pulmonary sensor(s) 970e (e.g., heart rate monitoring) may be achieved by capturing signals from a pulsometer built into the earpiece or another sensor (e.g., additional sensor devices 956) built into a low budget health monitoring device such as a fitness monitoring device or smart watch.

In some implementations, the sensor interface(s) 962 collects signals from the sensor(s) 970 and provides the signals to signal processing circuitry 964. The signal processing circuitry 964, for example, may include one or more filters (e.g., a bandpass filter), amplifiers, and/or other circuitry to remove noise, isolate valid incoming signals, and/or increase signal strength. In some embodiments, the signal processing circuitry 964 converts an analog signal to digital signal components.

In some implementations, sensor signals from the sensors 970, portable wireless computing device(s) 954, additional sensor device(s) 956 and/or clinical device(s)/equipment 958 are provided to system control circuitry 972 for data analysis. The system control circuitry 972, in some examples, may perform thresholding, pattern analysis, and/or variation over time analysis to recognize physiological, biological, and/or physical behaviors of a wearer of the therapeutic stimulation device corresponding to adjustments in treatment. For example, sensor data may be collected in a memory or temporary data storage region 976 for analyzing sensor data over a predetermined period of time. The period of time may differ, in some examples, based on the type of therapy provided, the type of data analyzed, and/or the therapeutic goal. The adjustments in treatment, in some examples, can include initiating treatment, ceasing treatment, and/or adjusting one or more treatment parameters (e.g., voltage, frequency, stimulation pattern, stimulation location(s), etc.).

In some implementations, the system control circuitry 972 provides sensor data to an external sensor data analytics system 952 via the network communications interface 968. The sensor data analytics system 952, in some examples, can include an edge router, a cloud computing platform, and/or one or more networked servers configured to analyze sensor data to identify circumstances that trigger an adjustment in treatment. The analysis, in some embodiments, involves biometric fingerprint analysis where the physiological, biological, and/or physical behaviors captured in the sensor data are analyzed in view of baseline or historic physiological, biological, and/or physical behaviors of the particular wearer.

In some implementations, based on analysis of the sensor data by the system control circuitry 972 and/or the sensor data analytics system 952, therapy parameter adjustments are provided to a therapy controller 974 for adjusting stimulation parameters delivered via therapy delivery circuitry 978 (e.g., pulse generator circuitry) to a set of stimulation electrodes 982. Therapy delivery circuitry 978 and stimulation electrodes 982 are discussed in greater detail above with reference to FIG. 9.

In a first illustrative example, upon reduction or removal of one or more symptoms, a therapeutic output may be similarly reduced or ceased. Conversely, upon increase or addition of one or more symptoms, the therapeutic output may be similarly activated or adjusted (increased, expanded upon, etc.).

In another illustrative example, feedback related to electrodermal activity could be used to monitor and detect the speed or timing of a symptom and/or therapeutic outcome. In an example, the electrodermal activity could be sensed by electrodermal sensors 970b. For example, an electrodermal patch with one or more electrodermal sensors 970b can be used to estimate the individual's stress levels by assessing cortisol levels in sweat.

In an example, the one or more movement detectors 970a may be configured to detect a tremor and/or physiologic movement. In an aspect, the tremor and/or the physiologic movement can be indicative of the underlying condition and/or the treatment to the underlying condition. In an example, the tremor and/or physiologic movement can be indicative of symptoms associated with substance withdrawal. In another example, movement and movement serial combinations can be used to assess the outcome of a training protocol aimed at restoring performance of these movements.

In a further example, feedback from glucose sensors 970c can be used to modulate the therapy. People suffering from diabetes 2 lack the ability to control glucose levels, and vagal stimulation has been shown to decrease hyperglycemia. Therefore, assessing glucose levels can be used to trigger stimulation to increase glycemic control.

In an additional example, neurological sensor(s) 970d and/or cardio-pulmonary sensors 970e may be used to assess heart rate and heart rate variability, to determine the activity of the autonomic nervous system in general and/or the relative activity of the sympathetic and parasympathetic branches of the autonomic nervous system, and to modulate the therapy. Autonomic nervous activity can be indicative of symptoms associated with substance withdrawal. In an aspect, the treatment device can be used to provide therapy for treating cardiac conditions such as atrial fibrillation and heart failure. In an example, therapy can be provided for modulation of the autonomic nervous system. In some implementations, the treatment device can be used to provide therapy to balance a ratio between any combinations of the autonomic nervous system, the parasympathetic nervous system, and the sympathetic nervous system.

In a further illustrative example, feedback signals collected by the muscle response sensor(s) 970f may be analyzed to trigger stimulation during physical movement recovery, such as arm movement recovery. For arm movement recovery, multiple muscle response sensors 970f can be arranged in a sleeve such as the NeuroLife® EMG Sleeve provided by Battelle Memorial Institute of Norwell, Massachusetts.

In a final illustrative example, attention, alertness, and/or wakefulness can be assessed by the ultrasonic sensor(s)

970h by measuring cerebral blood flow velocity (CBFV). In such an example, CBFV can be used as feedback to adjust therapy.

In some implementations, the sensor data analytics system 952 collects historic sensor data and treatment parameters across a population of patients and applies the collected data to performing machine learning analysis to refine therapeutic protocols and parameters at an individual level. This, for example, can lead to faster and/or a higher function recovery. Following a stroke or a TBI, in an illustrative example that may be used in a hospital setting, such as in the Intensive Care Unit (ICU) or the Neonatal Intensive Care Unit (NICU), data collected via sensors 970 such as, in some examples, heart rate (ECG), arterial oxygen saturation (SpO2), arterial blood pressure (in some cases using an arterial catheter), central venous pressure, core temperature, blood glucose level, breathing rate and/or volume, urine output, and/or cardiac output sensors, may be analyzed and applied in automatically directing and/or adjusting neuromodulatory treatment. In further examples, the sensor data may provide insight regarding osmolarity, serum electrolytes, and/or blood gases (arterial) that, in turn, could assist in making determinations when automatically directing and/or adjusting the neuromodulatory treatment. The sensor data, in some examples, may be analyzed for evidence of a comfort level of the patient (e.g., indicators of potential pain and/or stress in the patient), evidence of inflammation, and/or evidence of ischemic processes (e.g., evidence of build-up of metabolic waste).

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors, for example on one or more physical computing systems such as a computer farm or a cloud drive.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations. The hardware logic may be synthesized on a reprogrammable computing chip such as a field programmable gate array (FPGA), programmable logic device (PLD), or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein, such as the method 100 of FIG. 1A and FIG. 1B and/or the method 400 of FIG. 4A and FIG. 4B, may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable the pulse generator 750 of FIG. 7 and/or the system 960 of FIG. 9 to perform various methods and algorithms described above. Further, the processing circuitry and stored instructions may enable the peripheral device(s) 954, 990 of FIG. 9 to perform various methods and algorithms described above.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi, Bluetooth, Zigbee, or another wireless form of communication.

The computing device, such as the peripheral device(s) 954, 990 of FIG. 9, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display.

A sound controller, in some embodiments, is also provided in the computing device, such as the peripheral device(s) 954, 990 of FIG. 9, to interface with speakers/microphone thereby providing audio input and output.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Certain functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™, may be used perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google Cloud Storage, may store processed and unprocessed data supplied by systems described herein.

The systems described herein may communicate with the cloud computing environment through a secure gateway. In some implementations, the secure gateway includes a database querying interface, such as the Google BigQuery platform.

In some implementations, an edge server is used to transfer data between one or more computing devices and a cloud computing environment according to various embodiments described herein. The edge server, for example, may be a computing device configured to execute processor intensive operations that are sometimes involved when executing machine learning processes, such as natural language processing operations. An edge server may include, for example, one or more GPUs that are capable of efficiently executing matrix operations as well as substantial cache or other high-speed memory to service the GPUs. An edge server may be a standalone physical device. An edge server may be incorporated into other computing equipment, such as a laptop computer, tablet computer, medical device, or other specialized computing device. Alternatively or additionally, an edge server may be located within a carrying case for such computing equipment. An edge server, in a further example, may be incorporated into the communications and processing capabilities of a mobile unit such as a vehicle or drone, or may otherwise be located within the mobile unit.

In some implementations, the edge server communicates with one or more local devices to the edge server. The edge server, for example, can be used to move a portion of the computing capability traditionally shifted to a cloud computing environment into the local environment so that any computation intensive data processing and/or analytics required by the one or more local devices can run accurately and efficiently. In some embodiments, the edge server is used to support the one or more local devices in the absence of a connection with a remote computing environment. The edge server may be configured to communicate with the one or more local devices directly or via a network. For instance, the edge server can include a private wireless network interface, a public wireless network interface, and/or a wired interface through which the edge server can communicate with the one or more local devices. In some embodiments, certain local devices may be configured to communicate indirectly with the edge server, for example via another local device. Further, the edge server may be configured to communicate with a remote computing (e.g., cloud) environment via one or more public or private wireless network interfaces. The device interoperating with the edge server, for example, may share processing functionality with the edge server via one or more APIs implemented by the processes.

The systems described herein may include one or more artificial intelligence (AI) neural networks for performing automated analysis of data. The AI neural networks, in some examples, can include a synaptic neural network, a deep neural network, a transformer neural network, and/or a generative adversarial network (GAN). The AI neural networks may be trained using one or more machine learning techniques and/or classifiers such as, in some examples, anomaly detection, clustering, and/or supervised and/or association. In one example, the AI neural networks may be developed and/or based on a bidirectional encoder representations for transformers (BERT) model by Google of Mountain View, CA.

The systems described herein may communicate with one or more foundational model systems (e.g., artificial intelligence neural networks). The foundational model system(s), in some examples, may be developed, trained, tuned, fine-tuned, and/or prompt engineered to evaluate data inputs such as sensor inputs collected by the system 960 and/or the sensor data analytics system 952 of FIG. 9. The foundational model systems, in some examples, may include or be based off of the generative pre-trained transformer (GPT) models available via the OpenAI platform by OpenAI of San Francisco, CA (e.g., GPT-3, GPT-3.5, and/or GPT-4) and/or the generative AI models available through Azure OpenAI or Vertex AI by Google of Mountain View, CA (e.g., PaLM 2).

Certain foundational models may be fine-tuned as AI models trained for performing particular tasks required by the systems described herein. Training material, for example, may be submitted to certain foundational models to adjust the training of the foundational model for performing types of analyses described herein.

Multiple foundational model systems may be applied by the systems and methods described herein depending on context. The context, for example, may include type(s) of data, type(s) of response output desired (e.g., at least one answer, at least one answer plus an explanation regarding the reasoning that lead to the answer(s), etc.). In another example, the context can include user-based context such as demographic information, entity information, and/or product information. In some embodiments, a single foundational model system may be dynamically adapted to different forms of analyses requested by the systems and methods described herein using prompt engineering.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for delivering neurostimulation therapy to multiple neural structures by encoding dual-channel functionality in a single stimulation channel, the method comprising:
   positioning a first electrode of a neurostimulation device in electrical communication with a first neural structure of a wearer of the neurostimulation device;
   positioning a second electrode of the neurostimulation device in electrical communication with a second neural structure of the wearer, wherein the first electrode and the second electrode are arranged in electrical communication as a stimulation channel for neurostimulation delivery wherein,
      in a first channel of the dual-channel functionality of the stimulation channel, the first electrode delivers therapeutic stimulations while all pulses on the second electrode are subthreshold, and
      in a second channel of the dual-channel functionality of the stimulation channel, the second electrode delivers therapeutic stimulations while all pulses on the first electrode are subthreshold; and
   delivering, under control of a controller of the neurostimulation device, the neurostimulation therapy, wherein the controller directs a plurality of operations, the operations comprising
      delivering a first electrode pulse series via the first channel, the first electrode pulse series being configured to stimulate the first neural structure, the first electrode pulse series comprising
         a) delivering a first suprathreshold cathodic pulse to the first electrode to stimulate the first neural structure, thereby producing a corresponding first anodic pulse on the second electrode, and
         b) after delivering the first suprathreshold cathodic pulse, delivering a first charge-balancing subthreshold anodic pulse with reversed polarity of the first suprathreshold cathodic pulse to the first electrode, thereby producing a first corresponding cathodic pulse on the second electrode, wherein
            an amplitude of the first charge-balancing subthreshold anodic pulse is lower than an amplitude of the first suprathreshold cathodic pulse, and
            a pulse-width of the first charge-balancing subthreshold anodic pulse is longer than a pulse-width of the first suprathreshold cathodic pulse, such that an amplitude of the first corresponding cathodic pulse on the second electrode is subthreshold, and
      after delivering the first electrode pulse series, delivering a second electrode pulse series via the second channel, the second electrode pulse series being configured to stimulate the second neural structure, the second electrode pulse series comprising
         c) delivering a second suprathreshold cathodic pulse to the second electrode to stimulate the second neural structure, thereby producing a corresponding second anodic pulse on the first electrode, and
         d) after delivering the second suprathreshold cathodic pulse, delivering a second charge-balancing subthreshold anodic pulse with reversed polarity of the second suprathreshold cathodic pulse to the second electrode, thereby producing a second corresponding cathodic pulse on the first electrode, wherein
            an amplitude of the second charge-balancing subthreshold anodic pulse is lower than an amplitude of the second suprathreshold cathodic pulse, and
            a pulse-width of the second charge-balancing subthreshold anodic pulse is longer than a pulse-width of the second suprathreshold cathodic pulse, such that an amplitude of the second corresponding cathodic pulse on the first electrode is subthreshold.

2. The method of claim 1, wherein:
   steps (a) and (b) are repeated for a first pulse series period; and
   steps (c) and (d) are repeated for a second pulse series period.

3. The method of claim 2, wherein:
   repeating steps (a) and (b) comprises
      performing step (a) at a first low intensity level, and increasing, for a plurality of repetitions of step (a), to a first stepped-up intensity level according to a first up-down ramping pattern; and
   repeating steps (c) and (d) comprises
      performing step (c) at a second low intensity level, and increasing, for a plurality of repetitions of step (c), to a second stepped-up intensity level according to a second up-down ramping pattern;
   wherein each of the first up-down ramping pattern and the second up-down ramping pattern comprises at least two discrete upward steps in intensity followed by at least one discrete downward step in intensity.

4. The method of claim 3, wherein the first up-down ramping pattern is the second up-down ramping pattern.

5. The method of claim 3, wherein the first low intensity level is the second low intensity level.

6. The method of claim 1, wherein:
   steps (a) and (b) are repeated at a first frequency; and
   steps (c) and (d) are repeated at a second frequency different than the first frequency.

7. The method of claim 6, wherein repeating step (a) comprises delivering a modulated waveform comprising:
   a carrier waveform having biphasic square pulses at the first frequency, and
   a high-frequency signal component riding upon the carrier waveform, wherein
   the high-frequency signal component has a frequency with a range from 10 kHz to 75 kHz, and
   a peak-to-peak amplitude of the high-frequency signal component is within a range of 10% to 200% of an amplitude of the carrier waveform.

8. The method of claim 7, wherein an average amplitude of the high-frequency signal component is selected to maintain a substantially similar average current for delivering the modulated waveform as an average current for delivering the carrier waveform alone.

9. The method of claim 1, wherein delivering the first electrode pulse series and delivering the second electrode pulse series is repeated, in an interleaved fashion, for a duration of the neurostimulation therapy.

10. The method of claim 1, wherein the first electrode and the second electrode are non-percutaneous electrodes.

11. The method of claim 1, wherein the neurostimulation device is an auricular neurostimulation device worn on and/or about an ear of the wearer.

12. The method of claim 1, wherein delivering the first electrode pulse series comprises pausing for an inter-pulse interval between delivering the first suprathreshold cathodic pulse and delivering the first charge-balancing subthreshold anodic pulse.

13. The method of claim 1, wherein delivering the neurostimulation therapy comprises pausing for a predetermined period of time between delivering the first electrode pulse series and delivering the second electrode pulse series.

14. The method of claim 1, wherein:
the first neural structure is related to or in communication with one of i) vagal related neural structures, ii) auriculotemporal nerve structures, iii) neural structures related to a lesser occipital nerve, or iv) neural structures related to a great auricular nerve; and
the second neural structure is related to or in communication with another of i) the vagal related neural structures, ii) the auriculotemporal nerve structures, ii) the neural structures related to the lesser occipital nerve, or iv) the neural structures related to the great auricular nerve.

15. The method of claim 1, wherein the first electrode and the second electrode are paired with a same return electrode.

16. A system for delivering neurostimulation therapy to multiple neural structures by encoding dual-channel functionality in a single stimulation channel, the system comprising:
a neurostimulation device comprising a first electrode and a second electrode, wherein
the first electrode is configured to be positioned in electrical communication with a first neural structure of a wearer of the neurostimulation device,
the second electrode is configured to be positioned in electrical communication with a second neural structure of the wearer, and
the first electrode is arranged in electrical communication with the second electrode as a stimulation channel for neurostimulation delivery, wherein,
in a first channel of the dual-channel functionality of the stimulation channel, the first electrode delivers therapeutic stimulations while all pulses on the second electrode are subthreshold, and
in a second channel of the dual-channel functionality of the stimulation channel, the second electrode delivers therapeutic stimulations while all pulses on the first electrode are subthreshold; and
a controller configured to deliver neurostimulation therapy, delivering the neurostimulation therapy comprising
delivering a first electrode pulse series via the first channel, comprising
a) delivering a first suprathreshold cathodic pulse to the first electrode, thereby producing a corresponding first anodic pulse on the second electrode, and e) after delivering the first suprathreshold cathodic pulse, delivering a first charge-balancing subthreshold anodic pulse with reversed polarity of the first suprathreshold cathodic pulse to the first electrode, thereby producing a first corresponding cathodic pulse on the second electrode, wherein
an amplitude of the first charge-balancing subthreshold anodic pulse is lower than an amplitude of the first suprathreshold cathodic pulse, and
a pulse-width of the first charge-balancing subthreshold anodic pulse is longer than a pulse-width of the first suprathreshold cathodic pulse, such that an amplitude of the first corresponding cathodic pulse on the second electrode is subthreshold, and
after delivering the first electrode pulse series, delivering a second electrode pulse series via the second channel, comprising
b) delivering a second suprathreshold cathodic pulse to the second electrode, thereby producing a corresponding second anodic pulse on the first electrode, and
f) after delivering the second suprathreshold cathodic pulse, delivering a second charge-balancing subthreshold anodic pulse with reversed polarity of the second suprathreshold cathodic pulse to the second electrode, thereby producing a second corresponding cathodic pulse on the first electrode, wherein
an amplitude of the second charge-balancing subthreshold anodic pulse is lower than an amplitude of the second suprathreshold cathodic pulse, and
a pulse-width of the second charge-balancing subthreshold anodic pulse is longer than a pulse-width of the second suprathreshold cathodic pulse, such that an amplitude of the second corresponding cathodic pulse on the first electrode is subthreshold.

17. The system of claim 16, wherein:
steps (a) and (b) are repeated for a first pulse series period; and
steps (c) and (d) are repeated for a second pulse series period.

18. The system of claim 16, wherein:
steps (a) and (b) are repeated at a first frequency; and
steps (c) and (d) are repeated at a second frequency different than the first frequency.

19. The system of claim 16, wherein delivering the first electrode pulse series and delivering the second electrode pulse series is repeated, in an interleaved fashion, for a duration of the neurostimulation therapy.

20. The system of claim 16, wherein the first electrode and the second electrode are non-percutaneous electrodes.

21. The system of claim 16, wherein the neurostimulation device is an auricular neurostimulation device worn on and/or about an ear of the wearer.

* * * * *